(12) United States Patent
Yeh et al.

(10) Patent No.: US 10,691,268 B2
(45) Date of Patent: Jun. 23, 2020

(54) TOUCH SENSITIVE PROCESSING APPARATUS, METHOD AND ELECTRONIC SYSTEM

(71) Applicant: EGALAX_EMPIA TECHNOLOGY INC., Taipei (TW)

(72) Inventors: Shang-Tai Yeh, Taipei (TW); Cheng-Han Lee, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 179 days.

(21) Appl. No.: 15/802,756

(22) Filed: Nov. 3, 2017

(65) Prior Publication Data

US 2018/0120979 A1 May 3, 2018

Related U.S. Application Data

(60) Provisional application No. 62/450,272, filed on Jan. 25, 2017, provisional application No. 62/416,876, filed on Nov. 3, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04104* (2013.01); *G06F 2203/04111* (2013.01)

(58) Field of Classification Search
CPC ...... G06F 3/0446; G06F 3/044; G06F 3/0412; G06F 3/04104; G06F 3/04111; G06F 3/041662
See application file for complete search history.

*Primary Examiner* — Sahlu Okebato
(74) *Attorney, Agent, or Firm* — WPAT, PC

(57) ABSTRACT

A touch sensitive processing apparatus is used to detect at least one object approximating or touching a touch screen. The touch screen includes: multiple neighboring first electrodes and multiple neighboring second electrodes which are parallel to a first axis; and multiple neighboring third electrodes and multiple neighboring fourth electrodes which are parallel to a second axis. Each of the first electrodes intersects with the third electrodes to form multiple intersection areas, each of the second electrodes intersects with the fourth electrodes to form multiple intersection areas.

35 Claims, 16 Drawing Sheets

TOUCH SENSITIVE PROCESSING APPARATUS, METHOD AND ELECTRONIC SYSTEM

CROSS REFERENCE TO RELATED APPLICATIONS

This application claims the benefits of a provisional patent application No. 62/416,876, filed on Nov. 3, 2016 and another provisional patent application No. 62/450,272, filed on Jan. 25, 2017.

BACKGROUND OF THE INVENTION

1. Field of the Invention

The present invention relates to the field of mutual capacitive detecting electronic system, and more particularly, to a multiple round mutual capacitive detecting touch sensitive processing apparatus dealing with two sets sensing electrodes and method thereof.

2. Description of the Prior Art

Touch screens/panels (thereinafter touch screens) have already been one of the main input/output devices of modern consumer electronics. Especially, a screen in big size to have the function of touch sensing is the trend of market currently. For providing the coordinate position(s) of external conductive object(s) approaching or approximating a touch screen, a traditional touch sensitive processing apparatus needs to sequentially provide a driving signal to each of multiple first electrodes being parallel to a first direction, and to perform sensing by multiple second electrodes being parallel to a second direction. When all the electrodes are successively scanned (or sensed) in a round, the touch sensitive processing apparatus just reports the coordinate position(s) of all approaching or approximating event(s).

However, people's finger and the stylus's size will not become bigger as the size of the touch screen. For keeping the same resolution of approximating event in the touch screen in small size, the touch screen in big size configures a lot of first electrodes to maintain the intervals between/among the electrodes. As far as the touch screen in big size is concerned, it takes a lot of time to perform sequential scanning or sensing in a round and thus resulting in the reporting rate of approximating event being too slow. Therefore, a kind of mechanism for speeding up the reporting rate of approximating event is required to let user(s) keep the same or even have better experience in using the touch screen in big size.

SUMMARY OF THE INVENTION

According to one embodiment of the present invention, it provides a touch sensitive processing apparatus configured to connect to a touch screen and used to detect at least one approaching object approximating or touching the touch screen. The touch screen includes multiple first electrodes being parallel to each other and multiple second electrodes being parallel to each other. Each of the first electrodes intersects with the second electrodes to form multiple intersection areas. The touch sensitive processing apparatus includes: a driving circuit, connecting to the first electrodes, respectively; a sensing circuit, connecting to the second electrodes, respectively; and a processor, configured to connect to the driving circuit and the sensing circuit. The processor is used for executing multiple sets of first round mutual capacitive detecting steps. Wherein each set of the first round mutual capacitive detecting step further includes: having the driving circuit sending a driving signal to neighboring N first electrodes, where N is a positive integer larger than 1; and having the sensing circuit simultaneously detecting the driving signal via the second electrodes for generating multiple first round sensing information with respective to the set of first round mutual capacitive detecting step. Wherein each of the first round sensing information is corresponding to an intersection of central line of the N first electrodes and the second electrode.

According to one embodiment of the present invention, it provides an electronic system used to detect at least one approaching object approximating or touching a touch screen. The electronic system includes the touch screen and a touch sensitive processing apparatus connecting to the touch screen. The features of the touch screen and the touch sensitive processing apparatus connecting to the touch screen are described as above.

According to one embodiment of the present invention, it provides a touch sensitive processing method adaptive to a touch sensitive processing apparatus configured to connect to a touch screen and used to detect at least one approaching object approximating or touching the touch screen. The touch screen includes multiple first electrodes being parallel to each other and multiple second electrodes being parallel to each other. Each of the first electrodes intersects with the second electrodes to form a plurality of intersection areas. The touch sensitive processing method includes executing multiple sets of first round mutual capacitive detecting steps. Each set of the first round mutual capacitive detecting step further includes: having a driving circuit sending a driving signal to neighboring N first electrodes, where N is a positive integer larger than 1; and having a sensing circuit simultaneously detecting the driving signal via the second electrodes for generating multiple first round sensing information with respective to the set of first round mutual capacitive detecting step. Wherein each of the first round sensing information is corresponding to an intersection of central line of the N first electrodes and the second electrode.

According to one embodiment of the present invention, for speeding up the mechanism of the rate of reporting approximating event to let user(s) keeping the same or even having better experience in using the touch screen in big size, it provides a touch panel. The touch panel includes: multiple first electrodes being parallel to a first axis; multiple second electrodes being parallel to a second axis; and multiple third electrodes being parallel to the second axis. Each of the first electrodes is arranged to be spanned on the touch panel and intersects with the second electrodes or the third electrodes to form multiple intersection areas.

According to one embodiment of the present invention, for speeding up the mechanism of the rate of reporting approximating event to let user(s) keeping the same or even having better experience in using the touch screen in big size, it provides an electronic system. The electronic system includes a touch panel and a touch sensitive processing apparatus connecting to the touch panel. The touch panel includes: multiple first electrodes being parallel to a first axis; multiple second electrodes being parallel to a second axis; and multiple third electrodes being parallel to the second axis. Wherein each of the first electrodes is arranged to be spanned on the touch panel and intersects with the second electrodes or the third electrodes to form multiple intersection areas. The second electrodes connect to the touch sensitive processing apparatus via a first side of the touch panel. The third electrodes connect to the touch sensitive processing apparatus via a second side of the touch panel. Wherein the first side is parallel to the second side.

According to one embodiment of the present invention, for speeding up the mechanism of the rate of reporting approximating event to let user(s) keeping the same or even having better experience in using the touch screen in big size, it provides a touch screen. The touch screen includes: multiple first electrodes being parallel to a first axis; multiple second electrodes being parallel to a second axis; and multiple third electrodes being parallel to the second axis. Wherein each of the first electrodes is arranged to be spanned on the touch screen and intersects with the second electrodes or the third electrodes to form multiple intersection areas.

According to one embodiment of the present invention, for speeding up the mechanism of the rate of reporting approximating event to let user(s) keeping the same or even having better experience in using the touch screen in big size, it provides an electronic system. The electronic system includes a touch screen and a touch sensitive processing apparatus connecting to the touch screen. The touch screen includes: multiple first electrodes being parallel to a first axis; multiple second electrodes being parallel to a second axis; and multiple third electrodes being parallel to the second axis. Wherein each of the first electrodes is arranged to be spanned on the touch screen and intersects with the second electrodes or the third electrodes to form multiple intersection areas. The second electrodes connect to the touch sensitive processing apparatus via a first side of the touch screen. The third electrodes connect to the touch sensitive processing apparatus via a second side of the touch screen. Wherein the first side is parallel to the second side.

According to one embodiment of the present invention, for speeding up the mechanism of the rate of reporting approximating event to let user(s) keeping the same or even having better experience in using the touch screen in big size, it provides a touch sensitive processing apparatus configured to connect to a touch screen and used to detect at least one approaching object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing apparatus includes: a driving circuit, connecting to the first electrodes, respectively; a sensing circuit, connecting to the second electrodes and the third electrodes, respectively; and a processor, configured to connect to the driving circuit and the sensing circuit. The processor is configured for iteratively executing the following steps: having the driving circuit simultaneously sending a driving signal to two or more first electrodes, wherein at least one of the two or more first electrodes intersects with the second electrodes to form the multiple intersection areas, the other of the two or more first electrodes intersects with the third electrodes to form the multiple intersection areas; and having the sensing circuit simultaneously sensing the driving signal via the second electrodes to generate a one-dimensional sensing information, having the sensing circuit simultaneously sensing the driving signal via the third electrodes to generate another one-dimensional sensing information.

According to one embodiment of the present invention, for speeding up the mechanism of the rate of reporting approximating event to let user(s) keeping the same or even having better experience in using the touch screen in big size, it provides a touch sensitive processing method adaptive to a touch sensitive processing apparatus configured to connect to a touch screen and used to detect at least one approaching object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing method includes executing iteratively the following steps: having the driving circuit simultaneously sending a driving signal to two or more first electrodes, wherein at least one of the two or more first electrodes intersects with the second electrodes to form the multiple intersection areas, the other of the two or more first electrodes intersects with the third electrodes to form the multiple intersection areas; and having a sensing circuit simultaneously sensing the driving signal via the second electrodes to generate a one-dimensional sensing information, having the sensing circuit simultaneously sensing the driving signal via the third electrodes to generate another one-dimensional sensing information.

According to one embodiment of the present invention, for speeding up the mechanism of the rate of reporting approximating event to let user(s) keeping the same or even having better experience in using the touch screen in big size, it provides a touch sensitive processing apparatus configured to connect to a touch screen and used to detect at least one approaching object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing apparatus includes: a driving circuit, connecting to the first electrodes, respectively; a sensing circuit, connecting to the second electrodes and the third electrodes, respectively; and a processor, configured to connect to the driving circuit and the sensing circuit. The processor is configured for iteratively executing the following steps: having the driving circuit sending the driving signal to all of the first electrodes; having the sensing circuit simultaneously sensing the driving signal via the second electrodes to generate a one-dimensional first half screen sensing information, having the sensing circuit simultaneously sensing the driving signal via the third electrodes to generate a one-dimensional second half screen sensing information; determining if any approaching object approximates or touches at least one of the second electrodes according to the one-dimensional first half screen sensing information; determining if any approaching object approximates or touches at least one of the third electrodes according to the one-dimensional second half screen sensing information; and reporting to a host there is no approaching object when no approaching object approximating or touching at least one of the second electrodes and at least one of the third electrodes is determined.

According to one embodiment of the present invention, for speeding up the mechanism of the rate of reporting approximating event to let user(s) keeping the same or even having better experience in using the touch screen in big size, it provides a touch sensitive processing method adaptive to a touch sensitive processing apparatus configured to connect to a touch screen and used to detect at least one approaching object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing method includes: having a driving circuit sending a driving signal to all of the first electrodes; having a sensing circuit simultaneously sensing the driving signal via the second electrodes to generate a one-dimensional first half screen sensing information, having the sensing circuit simultaneously sensing the driving signal via the third electrodes to generate a one-dimensional second half screen sensing information; determining if any approaching object approximates or touches at least one of the second electrodes according to the one-dimensional first half screen sensing information; determining if any approaching object approximates or touches at least one of the third electrodes according to the one-dimensional second half screen sensing information; and reporting to a host there is no approaching object when no approaching object approximating or touching at least one of the second electrodes and at least one of the third electrodes is determined.

According to one embodiment of the present invention, for speeding up the mechanism of the rate of reporting approximating event to let user(s) keeping the same or even having better experience in using the touch screen in big size, it provides a touch sensitive processing apparatus configured to connect to a touch screen and used to detect at least one approaching object approximating or touching the touch screen. Wherein the touch screen includes multiple neighboring first electrodes and multiple neighboring second electrodes parallel to a first axis, multiple neighboring third electrodes and multiple of neighboring fourth electrodes parallel to a second axis. Wherein each of the first electrodes intersects with the third electrodes to form multiple intersection areas, each of the second electrodes intersects with the fourth electrodes to form multiple intersection areas. The touch sensitive processing apparatus includes: a driving circuit, connecting to the first electrodes and the second electrodes, respectively; a sensing circuit, connecting to the third electrodes and the fourth electrodes, respectively; and a processor, configured to connect to the driving circuit and the sensing circuit. The processor is configured for: executing multiple sets of first round mutual capacitive detecting steps, wherein each set of the first round mutual capacitive detecting step further includes: having the driving circuit sending a driving signal to neighboring N first electrodes and neighboring N second electrodes, where N is a positive integer larger than 1; having the sensing circuit simultaneously detecting the driving signal via the third electrodes for generating multiple first round first sensing information with respective to the set of first round mutual capacitive detecting step, wherein each of the first round first sensing information is corresponding to an intersection of central line of the N first electrodes and the third electrode; and having the sensing circuit simultaneously detecting the driving signal via the fourth electrodes for generating multiple first round second sensing information with respective to the set of first round mutual capacitive detecting step, wherein each of the first round second sensing information is corresponding to an intersection of central line of the N second electrodes and the fourth electrode.

According to one embodiment of the present invention, for speeding up the mechanism of the rate of reporting approximating event to let user(s) keeping the same or even having better experience in using the touch screen in big size, it provides a touch sensitive processing method adaptive to a touch sensitive processing apparatus configured to connect to a touch screen and used to detect at least one approaching object approximating or touching the touch screen. Wherein the touch screen includes multiple neighboring first electrodes and multiple neighboring second electrodes parallel to a first axis, multiple neighboring third electrodes and multiple neighboring fourth electrodes parallel to a second axis. Wherein each of the first electrodes intersects with the third electrodes to form the multiple intersection areas, each of the second electrodes intersects with the fourth electrodes to the form multiple intersection areas. The touch sensitive processing method includes: executing multiple sets of first round mutual capacitive detecting steps, wherein each set of the first round mutual capacitive detecting step further includes: having a driving circuit sending a driving signal to neighboring N first electrodes and neighboring N second electrodes, where N is a positive integer larger than 1; having a sensing circuit simultaneously detecting the driving signal via the third electrodes for generating multiple first round first sensing information with respective to the set of first round mutual capacitive detecting step, wherein each of the first round first sensing information is corresponding to an intersection of central line of the N first electrodes and the third electrode; and having the sensing circuit simultaneously detecting the driving signal via the fourth electrodes for generating multiple first round second sensing information with respective to the set of first round mutual capacitive detecting step, wherein each of the first round second sensing information is corresponding to an intersection of central line of the N second electrodes and the fourth electrode.

According to one embodiment of the present invention, for speeding up the mechanism of the rate of reporting approximating event to let user(s) keeping the same or even having better experience in using the touch screen in big size, it provides a touch sensitive electronic system. The touch sensitive electronic system includes the touch screen described above and a touch sensitive processing apparatus connecting to the touch screen. The features of the touch screen and the touch sensitive processing apparatus are as those described above.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
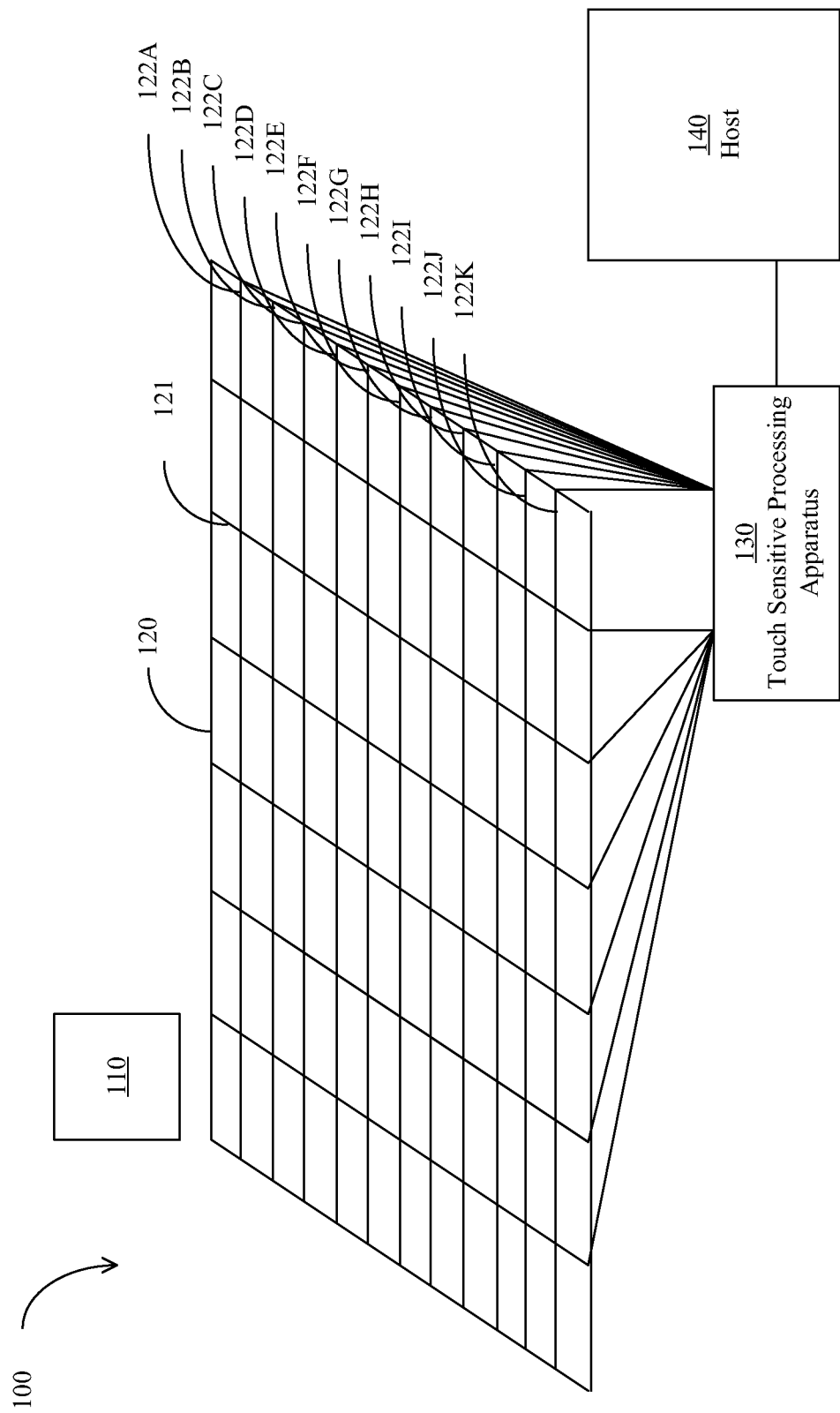
FIG. 1 illustrates a diagram of an electronic apparatus 100 according to an embodiment of the present invention.

Some embodiments of the present invention are described in detail below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted. Besides, between/among the steps shown in the flowcharts of the present invention, a/some step(s) irrelative to the present invention may be inserted. The present invention does not limit the executing order of the steps except for causal relationship.

Referring to FIG. 1, it shows an electronic device 100 according to an embodiment of the present invention. The electronic device 100 includes a touch screen 120. The touch screen 120 includes multiple sensing electrodes 121 being parallel to each other and multiple driving electrodes 122 being parallel to each other. Multiple intersections are formed by these two kinds of electrodes. The electronic device 100 further includes a touch sensitive processing apparatus 130 configured to connect to each of the sensing electrodes 121 and the driving electrodes 122 mentioned above, and used to detect or sense an external conductive object 110 which approaches or approximates to the touch screen 120. The electronic device 100 further includes a host 140 configured to connect to the touch sensitive processing apparatus 130.

In some embodiments, the host 140 may be one or some processor(s) and memory/memories which perform an operation system for controlling the electronic device 100. For example, such as Intel x86 instruction set processor performing Microsoft Windows system; Qualcomm ARM instruction set processor performing Google Android system; Apple A9 processor performing Apple iOS system, and so on.

In some embodiments, the touch sensitive processing apparatus 130 includes an embedded processor, for example, such as Intel i960 processor, 8051 processor, ARM Cortex M series of processors, ARM7, ARM9, etc. The processor embedded in the touch sensitive processing apparatus 130 may perform related touch sensitive instructions for controlling the electrical signals emitting and receiving by each of the first (or sensing) electrodes 121 and each of the second (driving) electrodes 122, and then transmits the touch related information got from having been processed to the host 140.

As shown in FIG. 1, the multiple driving electrodes 122 from the top to the bottom may be the second electrodes 122A-K. The touch sensitive processing apparatus 130 drives in turn the multiple driving electrodes 122 to cover the whole touch screen 120. When each of the driving electrodes 122 is driven, sensing operations on all the first (sensing) electrodes 121 are performed. The time for the traditional scanning or sensing in FIG. 1 relates to the number of the second electrodes 122.

In some embodiments, the touch sensitive processing apparatus 130 may divide the driving electrodes 122 into the groups for multi-round driving to cover the whole touch screen 120. In some embodiments of N-round driving, each N driving electrodes being adjacent to each other is combined to be a set of driving electrode which send the driving signal at the same time.

For example, in the embodiment of 2-round driving, a first round and a second round are separately driven to cover the whole touch screen 120. In the first round, the driving electrodes 122A and 122B are the first set, the driving electrodes 122C and 122D are the second set, etc. In the second round, the driving electrodes 122B and 122C are the first set, the driving electrodes 122D and 122E are the second set, and so on.

Figure 2:
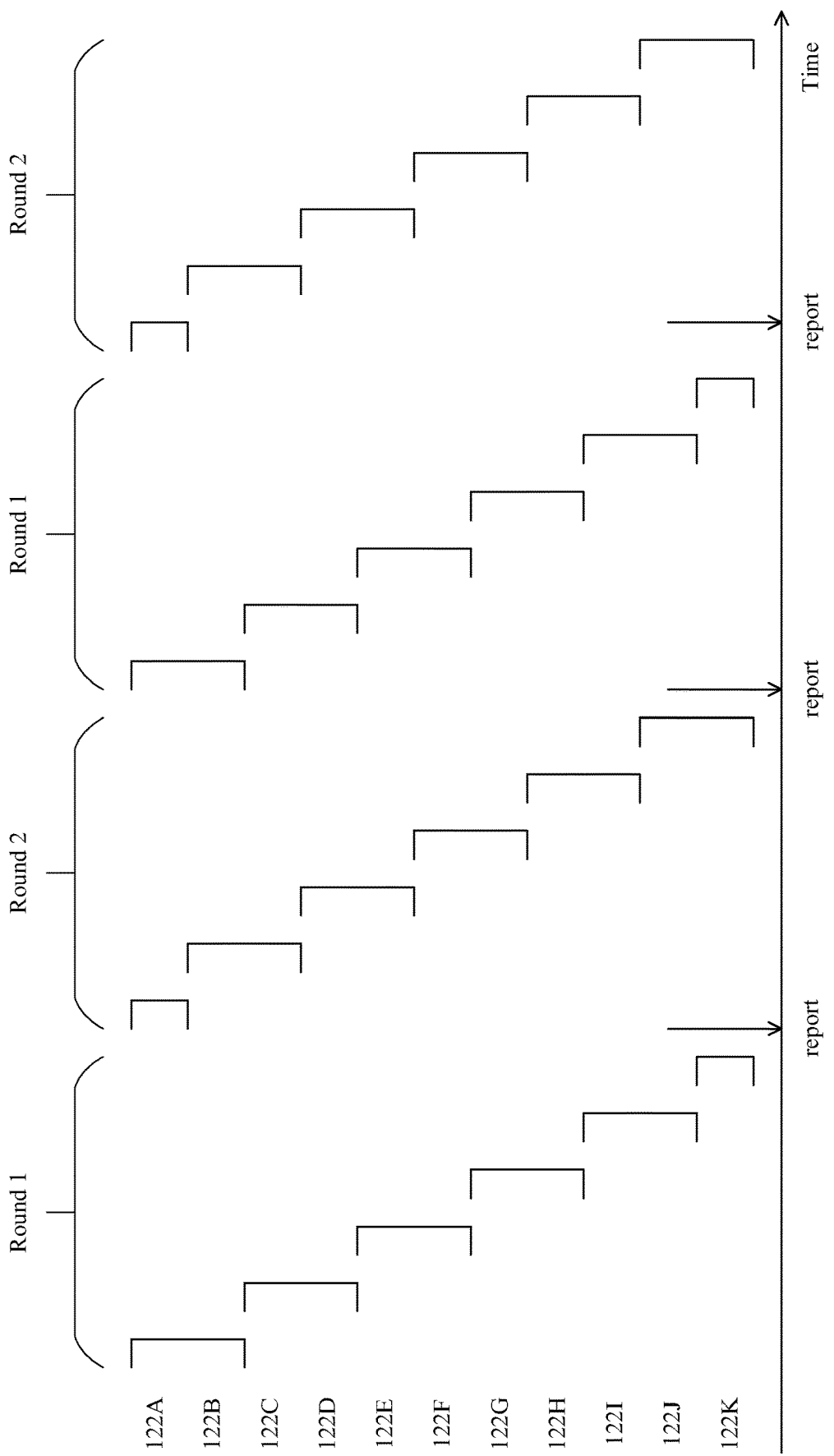
FIG. 2 illustrates a timing diagram of a two-round driving according to an embodiment of the present invention.

Referring to FIG. 2, it shows a timing for 2-round driving according to an embodiment of the present invention. As the embodiment shown in FIG. 1, the touch screen 120 includes the driving electrodes 122A-K arranged in order. In the first-round driving, the driving signal is firstly provided to the driving electrodes 122A and 122B at the same time, next the driving signal is provided to the driving electrodes 122C and 122B all at once, and so on. Until the last driving electrode 122K, the touch sensitive processing apparatus 130 singly provides the driving signal to the driving electrode 122K since there is no driving electrode to be made a pair with it. Because of driving single electrode only, the touch sensitive processing apparatus 130 may direct to and adjust waveform, voltage, strength of the driving signal, driving duration, and timing of driving. Furthermore, it may also direct to and adjust detecting duration, timing of detecting, time difference between the sensing timing and driving timing, resistance value of variable resistor of the sensing circuit, and gain value of amplifier of the sensing circuit of each sensing electrode 121. These make the sensing strengths of a single driving electrode with regard to two driving electrodes are equivalent. The touch sensitive processing apparatus 130 may report the host 140 after the first-round sensing. Compared to the traditional one, the first-round touch sensing may save about half the time.

Next, to the second round, the touch sensitive processing apparatus 130 singly provides the driving signal to the driving electrode 122A since there is no driving electrode to be made a pair with it. Because of driving single electrode only, the touch sensitive processing apparatus 130 may direct to and adjust the time, the strength, etc., of the driving signal. Furthermore, it may also direct to and adjust the time duration of sensing, the time difference between sensing timing and driving timing, and/or the gain value of sensing circuit of each sensing electrode 121. These make the sensing strengths of single driving electrode and of two driving electrodes are equivalent. Then, the driving signal is provided to the driving electrodes 122B and 122C simultaneously, next the driving signal is provided to the driving electrodes 122D and 122E concurrently, and so on, until the last set of driving electrodes 122J and 122K. The touch sensitive processing apparatus 130 may report the host 140 after the second-round sensing. Compared to the traditional one, the second-round touch sensing may save about half the time.

Because two electrodes 122 are driven simultaneously, the sensed signal uses the central position of the two driving electrodes 122 as a base for addition. Therefore, to a motionless approximating object, its coordinate positions calculated from the first-round sensing and the second-round sensing are not the same, that is, moving up and down at two coordinate points. The host 140 may direct to fix this status by averaging the coordinate positions respectively got from the approximating event in the first-round and the approximating event in the second-round. Or the host 140 may average the coordinate positions got from the latest two approximating events to get the coordinate closer to real approximating position.

In the abovementioned embodiment, the host 140 selectively averages the approximating events got from the latest two rounds. The host 140 does not know that the approximating object has a bigger effect in the first-round sensing or the second-round sensing, so it seems the effects of the approximating object in the two rounds' sensing are equivalent. For example, an approximating object is quite close to the driving electrode 122D but it is between the driving electrodes 122C and 122D. In the first-round scanning (or sensing) to the driving electrodes 122C and 122D, a first approximating event and a related first coordinate are got. In the second-round scanning (or sensing) to the driving electrodes 122D and 122E, a second approximating event and a related second coordinate are got. Supposedly, the sensing quantity of the first approximating event should be bigger than the sensing quantity of the second approximating event because the position of the approximating object is between the driving electrodes 122C and 122D. Since the touch sensitive processing apparatus 130 report the information to the host 140 which only includes the first coordinate and the second coordinate but does not include the sensing quantities of the first approximating event and the second approximating event, the method that the host 140 averages the first coordinate and the second coordinate is not precise yet.

Figure 3:
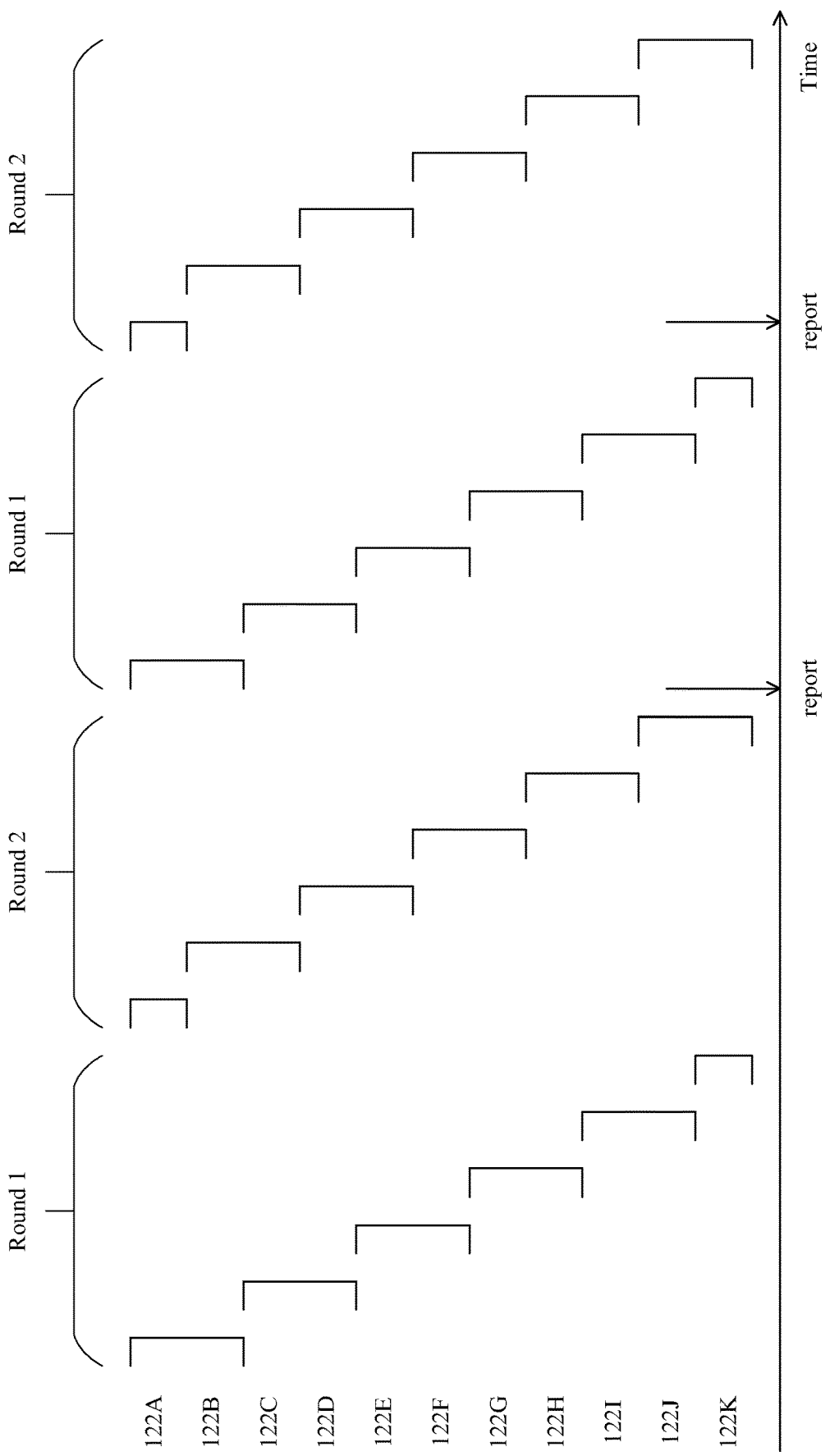
FIG. 3 illustrates a timing diagram of a two-round driving according to an embodiment of the present invention.

Referring to FIG. 3, it shows a timing for 2-round driving according to an embodiment of the present invention. The difference to the embodiment of FIG. 2 is that the touch sensitive processing apparatus 130 will perform a first-round sensing and a second-round sensing firstly to get the first-round's approximating event and related coordinate and the second-round's approximating event and related coordinate, correspondingly. Next, the touch sensitive processing apparatus 130 will perform weighted operations to the first-round coordinate and the second-round coordinate according to the sensing quantity of the first-round approximating event and the sensing quantity of the second-round approximating event, respectively, to get the more precise position.

Therefore, in FIG. 3, the touch sensitive processing apparatus 130 reports the coordinate to the host 140 according to the latest two rounds' information except that the touch sensitive processing apparatus 130 does not report to the host 140 at the first-round sensing. The reporting rate is double to the traditional one except that the first reporting rate is about equal to the traditional one.

In the embodiments shown in FIG. 2 and FIG. 3, the sets of the driving electrodes 122 are sequentially driven from the top to the bottom. However, this sequential driving method may cause a fixed frequency EMI with other parts inside the electronic apparatus 100 or other electronic apparatuses around the electronic apparatus 100. Therefore, in another embodiment, the sets of the driving electrodes 122 are driven in random in order to reduce EMIs in some certain frequencies.

Figure 4:
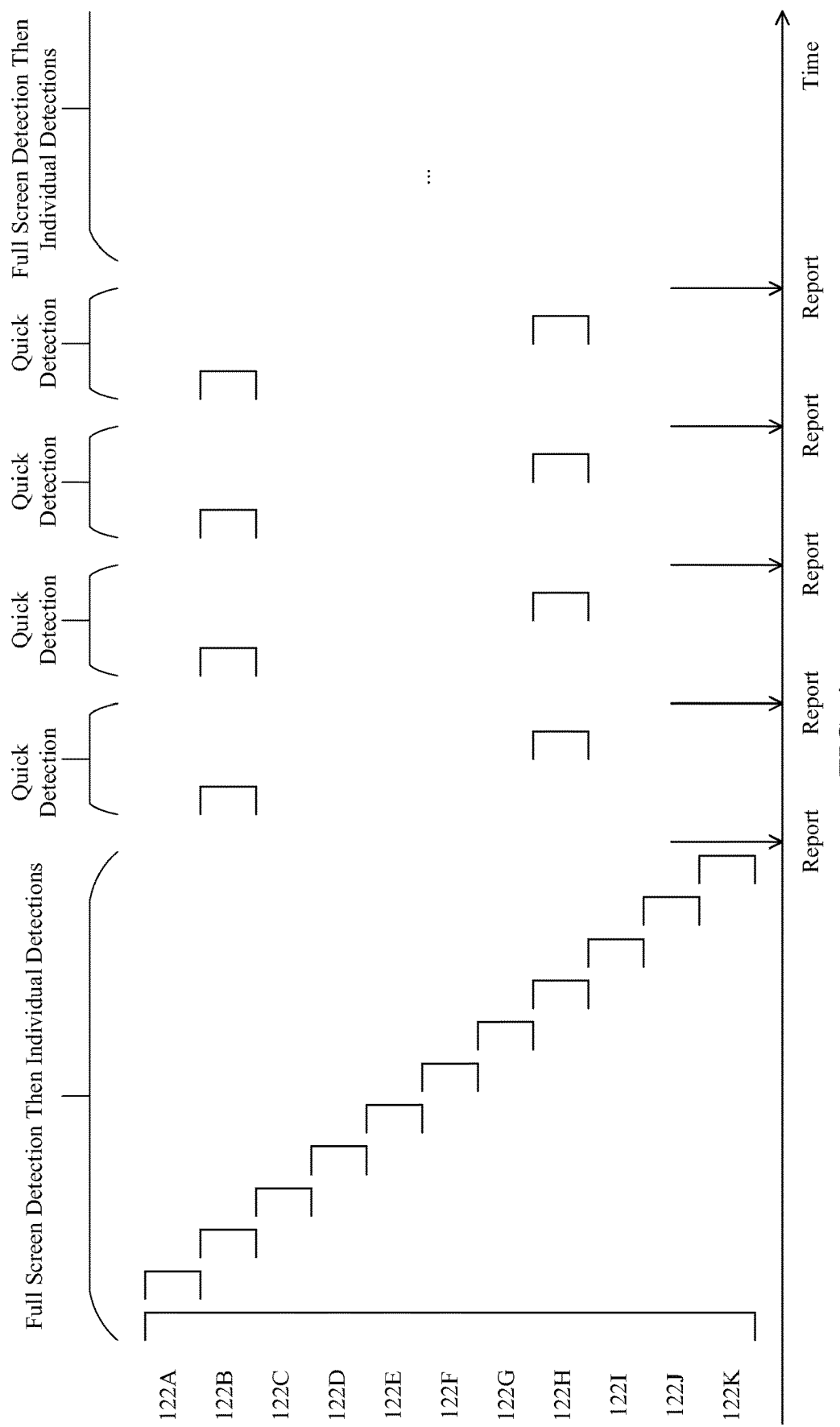
FIG. 4 illustrates a timing diagram of a accelerating sensing according to an embodiment of the present invention.

Although the reporting rates of FIGS. 2 and 3 is double to the traditional one, there are other sensing modes' reporting rate may be higher than double traditional one. Referring to FIG. 4, it shows an accelerating sensing according to an embodiment of the present invention. In FIG. 4, a whole screen driving is performed firstly, that is, the driving signal is simultaneously provided to the driving electrodes 122A-K. The touch sensitive processing apparatus 130 may determine whether an approximating object exists according to the sensing results from all sensing electrodes 121. If not, the touch sensitive processing apparatus 130 may report no approximating object to the host 140. In other words, when there is no any approximating object, using the whole screen driving would have the fastest reporting rate.

As shown in FIG. 4, when the touch sensitive processing apparatus 130 determines the approximating object exists, it may sequentially provide the driving signal to the driving electrodes 122A-K. When the touch sensitive processing apparatus 130 determines approximating objects near the driving electrodes 122B and 122H, it may report to the host 140. Then, several times of accelerating sensings may be performed, that is, only providing the driving signal to the driving electrodes 122B and 122H to perform sensing, and reporting to the host 140.

It can be imaged that if the quantity of approximating object(s) is smaller, the time spent by the accelerating sensing is less. The reporting rate is reporting number divided by the total time of one whole screening sensing and several times of accelerating sensing. When the reporting rate is higher than double traditional one, this sensing may be adapted. However, when the quantity of approximating objects is bigger, making the reporting rate less than half the traditional one, the sensing ways of FIGS. 2 and 3 may be switched to.

Figure 5:
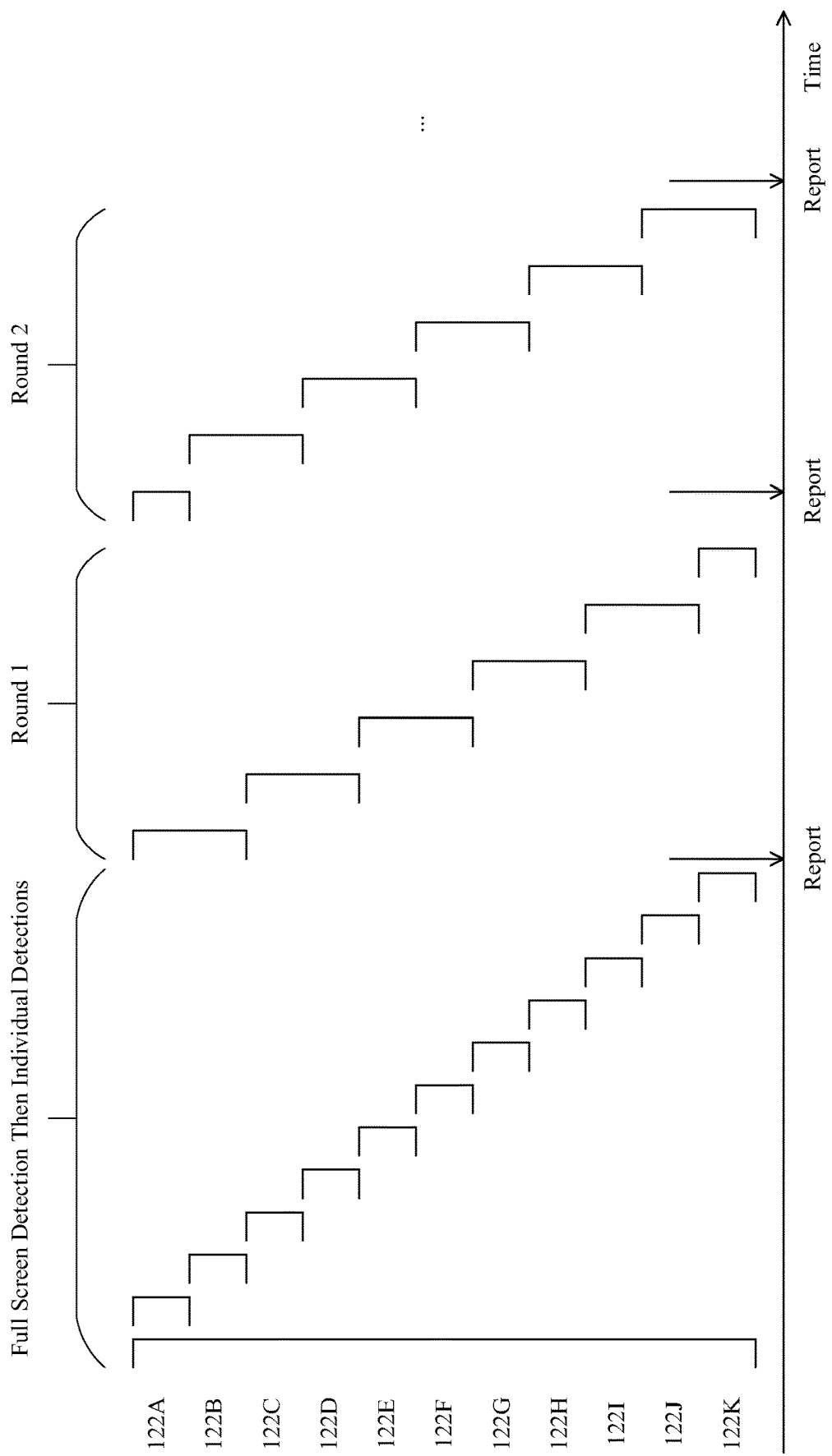
FIG. 5 illustrates a timing diagram of a switch between sensing methods according to an embodiment of the present invention.

Referring to FIG. 5, it shows a switching of sensing way according to an embodiment of the present invention. FIG. 5 is the same as FIG. 4 at the beginning, performing the whole screen driving firstly, that is, providing the driving signal to the driving electrodes 122A-K simultaneously. The touch sensitive processing apparatus 130 may determine whether an approximating object exists according to the sensing results from all sensing electrodes 121. When the touch sensitive processing apparatus 130 determines the approximating object exists, it may sequentially provide the driving signal to the driving electrodes 122A-K. When the quantity of approximating objects is bigger and making the reporting rate less than half the traditional one, the touch sensitive processing apparatus 130, for example, may switches to the sensing ways of FIGS. 2 and 3 after reporting to the host 140. As shown in FIG. 5, the touch sensitive processing apparatus 130 switches to the sensing way of FIG. 2.

Conversely, when the embodiments of FIGS. 2 and 3 are implemented, and if the touch sensitive processing apparatus 130 determines the quantity of the approximating objects is smaller, and the reporting rate by using the embodiment shown in FIG. 4 (a whole screen and sequential driving and several times of accelerating sensing) is faster, the sensing way shown in FIG. 2 or FIG. 3 may switch to the sensing way shown in FIG. 4.

In a variation of the embodiment in FIG. 5, when a whole screen driving and detecting is performing and an approaching object is determined by the touch sensitive processing apparatus 130 according to the sensing results of all sensing electrodes 121, the sequential driving and detecting shown in the embodiment of FIG. 5 may be omitted and a multiple round detecting is performed directly. By doing so, because of omitting the time of sequential driving and detecting, the first reporting time will faster than that of the embodiment in FIG. 5.

To sum up, the present application provides several sensing ways having faster reporting rate than the traditional one. Moreover, according to the quantity of the approximating object(s), the present application may provide the determining conditions for switching the sensing ways. The present application may let the host 140 receive more approximating event reports in one unit of time to make user(s) have better touch sensitive experience, especially in using the touch sensitive screen in big size.

Figure 6:
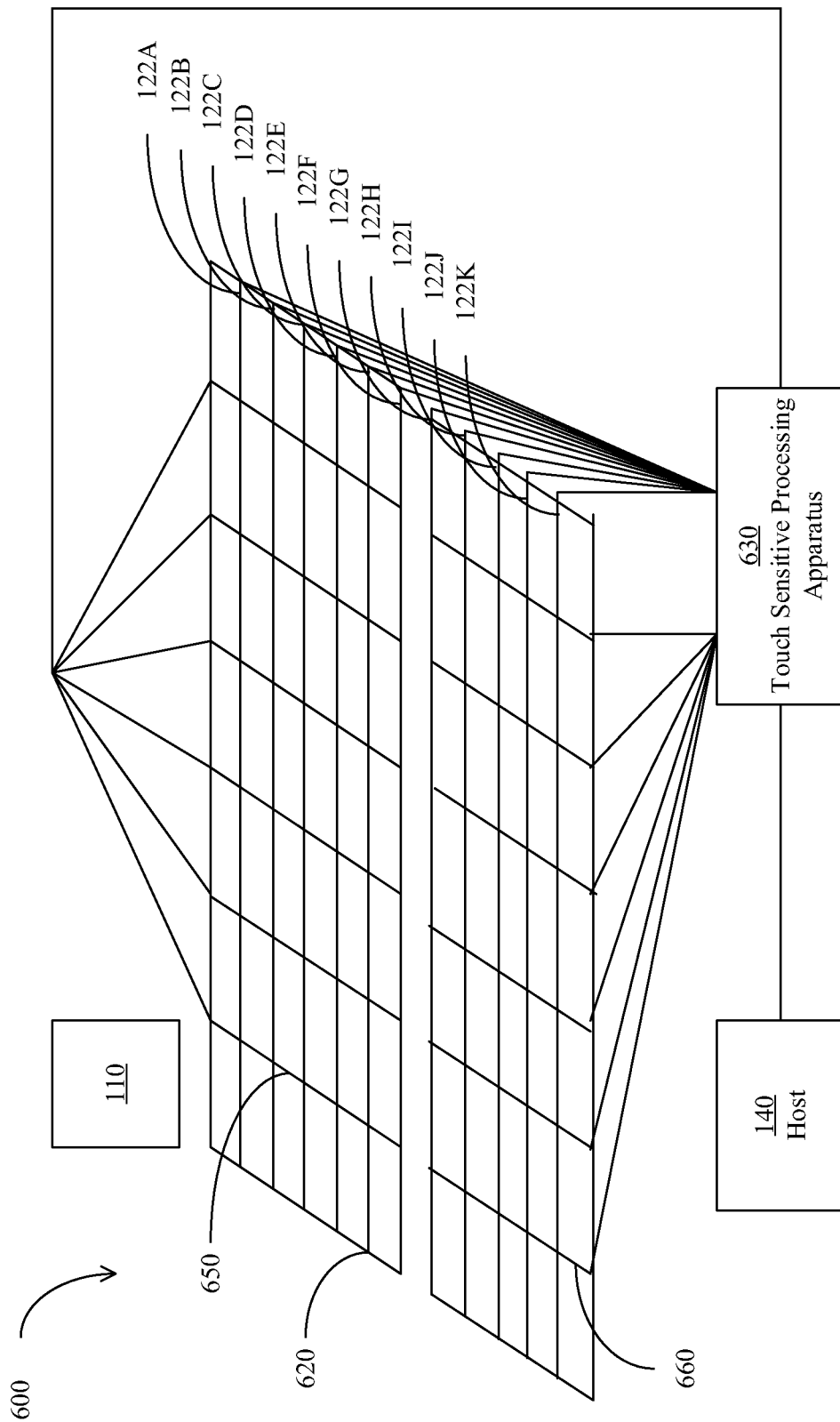
FIG. 6 illustrates a diagram of an electronic apparatus 600 according to an embodiment of the present invention.

Referring to FIG. 6, it shows an electronic system 600 according to an embodiment of the present invention. The electronic system 600 includes a touch panel or screen 620 (thereinafter touch screen). The touch screen 620 includes multiple driving electrodes 122 being parallel to each other, multiple upper half sensing electrodes 650 being parallel to each other, and multiple lower half sensing electrodes 660 being parallel to each other. Multiple intersections are formed on the upper half of the touch screen 620 by the multiple driving electrodes 122 and multiple upper half sensing electrodes 650. Multiple intersections are formed on the lower half of the touch screen 620 by the multiple driving electrodes 122 and multiple lower half sensing electrodes 660. The electronic device 600 further includes a touch sensitive processing apparatus 630 configured to connect to each of the upper half sensing electrodes 650, the lower half sensing electrodes 660, and the driving electrodes 122 mentioned above, and used to detect or sense an external conductive object 110 which approaches or approximates to the touch screen 620. The upper half sensing electrodes 650 connect to the touch sensitive processing apparatus 630 from the upper half side of the touch screen 620. The lower half sensing electrodes 660 connect to the touch sensitive processing apparatus 630 from the lower half side of the touch screen 620. The electronic device 600 further includes a host 140 configured to connect to the touch sensitive processing apparatus 630.

In some embodiments, the touch sensitive processing apparatus 230 includes an embedded processor, for example, such as Intel i960 processor, 8051 processor, ARM Cortex M series of processors, ARM7, ARM9, etc. The processor embedded in the touch sensitive processing apparatus 230 may perform related touch sensitive instructions for controlling the electrical signals emitting and receiving by each of the electrodes 122, 650, and 660, and then transmits the touch related information got from having been processed to the host 140.

As shown in the embodiment of FIG. 6, since the number of the driving electrodes 122 is eleven in an odd number, the touch screen 620 may divided into the upper and lower halves from the interval between the sixth and the seventh driving electrodes 122. The upper half compared to the lower half has one more driving electrode. When the number of the driving electrodes 122 is an even number, the upper and lower halves of the touch screen 620 may have the same number of the driving electrodes 122.

Moreover, as shown in the embodiment of FIG. 6, the number and the positions of the upper half sensing electrodes 650 and the lower half sensing electrodes 660 are corresponded. Each of the upper half sensing electrodes 650 correspond to one of the lower half sensing electrodes 660 so that the position of the external conductive object 110 can be calculated by the touch sensitive processing apparatus 630.

Figure 7:
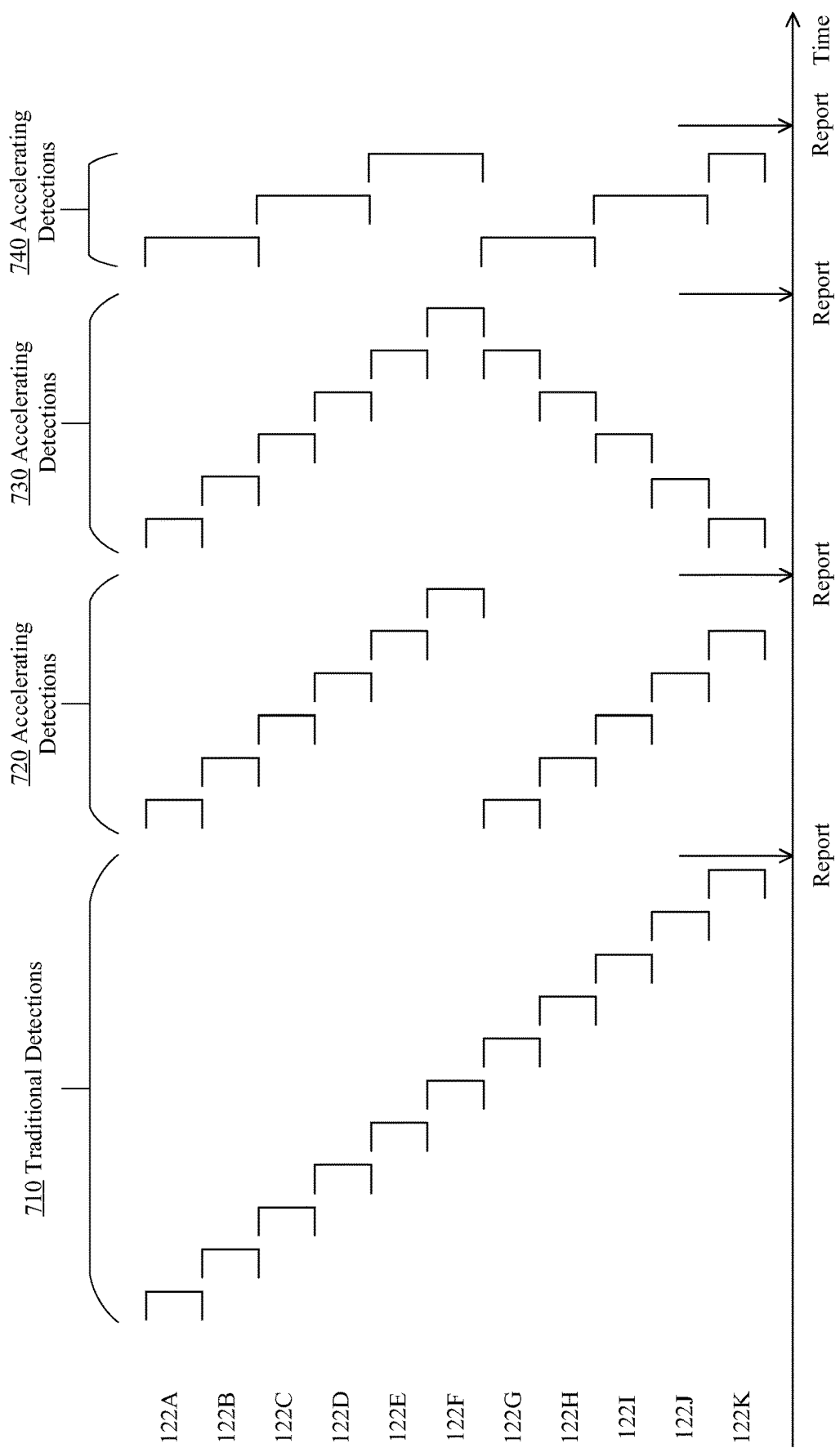
FIG. 7 shows a method for mutual capacitive sensing according to an embodiment of the present invention.

Referring to FIG. 7, it shows mutual-capacitance sensing ways according to the embodiments of the present invention. On the left side of FIG. 7, a traditional sensing way 710 for the traditional touch sensitive processing apparatus 130 to the touch screen 120 is illustrated and is adaptive to the embodiment of FIG. 1. The traditional touch sensitive processing apparatus 130 transmits in turn the driving signal to the driving electrodes 122A-K and performs sensing by the sensing electrodes 121. After each of the driving electrodes 122 is driven, the traditional touch sensitive processing apparatus 130 sends one approximating even report to the host 140.

FIG. 7 also shows three accelerating sensing ways 720, 730, and 740 adaptive to the embodiment of FIG. 6. At the beginning of the accelerating sensing ways 720, the touch sensitive processing apparatus 630 simultaneously provides the driving signal to two driving electrodes 122A and 122G respectively belonging to the upper and the lower halves, that is, the top driving electrodes 122 in the upper and the lower halves, respectively. At the same time, the touch sensitive processing apparatus 630 also respectively receives the driving signals sensed by the upper half sensing electrodes 650 and the lower half sensing electrodes 660. Next, the touch sensitive processing apparatus 630 sequentially performs the abovementioned steps to provide the driving signal to two driving electrodes respectively belonging to the upper and the lower halves. In the last round, the driving electrodes belonging to the lower half are driven completely, thus only the driving electrode 122F in the upper half needs to be driven and only the driving signal sensed by the sensing electrode 650 in the upper half needs to be received. After this step, the touch sensitive processing apparatus 630 sends one approximating event report to the host 140.

Obviously, the accelerating sensing way 720 is faster than the traditional sensing way 710 about double in time, that is, for example, the reporting rate of approximating event is faster about twice. The cost is to provide double sensing circuits to simultaneously respectively connect to the multiple upper half sensing electrodes 650 being parallel to each other and the multiple lower half sensing electrodes 660 being parallel to each other.

Similarly, the difference between the accelerating sensing ways 730 and 720 is that the driving direction for the touch sensitive processing apparatus 630 in the lower half is from the bottom to the top. This is also different to the driving direction in the upper half being from the top to the bottom. Also, the accelerating sensing way 730 is faster than the traditional sensing way 710 about double in time, that is, for example, the reporting rate of approximating event is faster about twice.

The accelerating sensing ways 740 is alike those shown in FIG. 2 and FIG. 3, that is, grouping the upper and lower halves of driving electrodes 122. As shown in FIG. 7, the six driving electrodes 122A-F in upper half are divided into three groups, the driving electrodes 122G-K in lower half are also divided into three groups, but the driving electrode 122K is the only one in its group. The accelerating sensing ways 740 may be the same as those shown in FIG. 2, performing two-round sensing ways, respectively. In the first round sensing of upper half of the touch screen, the six driving electrodes 122A-F are driven by group in turn. At the same time, in the first round sensing of lower half of the touch screen, the five driving electrodes 122G-K are driven by group in turn, that is, driving a set of driving electrodes 122G-H firstly, then driving another set of driving electrodes 122I-J, and finally driving the single driving electrode 122K. After the first round sensing is finished, reporting the approaching object detected by the upper half and the lower half of the touch screen may be respectively performed. In the second round of the upper half touch screen, since the driving electrodes of the upper half touch screen are even, the same order for driving the six driving electrodes 122A-F by group in turn can be adapted. But in the second round of the lower half touch screen, since the driving electrodes of the lower half touch screen are odd, the single driving electrode 122G may be driven firstly, next a set of driving electrode, and finally another set of the driving electrodes 122J-K. After the second round sensing is finished, reporting the approaching object detected by the upper half and the lower half of the touch screen may be respectively performed.

The accelerating sensing ways 740 may be also the same as the method shown in FIG. 2. After performing first two rounds of sensing, the coordinate according to this two rounds' sensing information is just reported to the host 140. Except for the rate of the first reporting being equal to the rate of traditional reporting, the follow-up rates of reporting are two times of the rate of traditional reporting.

Similarly, the upper half and the lower half touch screen in FIG. 6 can be respectively seemed to independent touch screens adaptive to the implementations of FIG. 4 and FIG. 5. That is, half screen driving and detecting is performed to the upper half and the lower half touch screen respectively. When an approaching object is detected by the half touch screen, the sequence driving and detecting is just performed on the half touch screen and next the accelerating sensing is performed. Or, the half screen driving and detecting is firstly performed to the upper half and the lower half touch screen respectively. When an approaching object is detected by the half touch screen, the multiple round sensing is just performed on the half touch screen.

The present invention may have other driving ways. For example, the touch sensitive processing apparatus 630 may singly provide the driving signal to the driving electrode 122F firstly. Next, the touch sensitive processing apparatus 630 provides the driving signal to each of the driving electrodes 122 from the bottom to the top in the upper half and from the top to the bottom in the lower half.

In some embodiments, to protect the electronic device 600 from regular electromagnetic interference (EMI) resulting from sequential driving direction, the touch sensitive processing apparatus 630 may even use a random way to finish the driving and sensing in the upper and the lower halves. The sensing way in each round may use a random way, e.g., the same random way may be used in the upper and the lower halves, or the different random way may be used in the upper and the lower halves. Even a certain half uses a random way to perform sensing and the other uses a sequential way to perform sensing. The object is to avoid the regular EMI generated by the touch screen 620, to lower the EMI effect to other equipment in the electronic device 600, such as the wireless communication interface or screen, or to reduce the EMI to other equipment beside the electronic device 600.

In the embodiment of FIG. 6, the driving electrodes 122 are parallel to the direction of the horizontal axis which the touch screen 620 refreshes pixels, and thus the touch screen 620 is divided into two parts in the upper and the lower halves. In some embodiments, the touch screen 620 may be divided into two parts in the left and the right halves. The driving electrodes 122 are vertical to the direction of the horizontal axis which the touch screen 620 refreshes pixels. Multiple left half sensing electrodes being parallel to each other connect to the touch sensitive processing apparatus 630 from the left side of the touch screen 620. Multiple right half sensing electrodes being parallel to each other connect to the touch sensitive processing apparatus 630 from the right side of the touch screen 620. Except for the direction being changed, the sensing ways of the touch sensitive processing apparatus 630 may use the sensing ways according to the accelerating sensing ways 720 and 730 shown in FIG. 7, and the variations of various abovementioned sensing ways.

One of the advantages in using the upper and the lower halves shown in FIG. 6 is that the driving electrodes 122 are parallel to the direction of pixel horizontal axis. When a certain driving electrode sends the driving signal and the pixel horizontal axis near the certain driving electrode just performs refreshing, the driving signals sensed by all the upper half sensing electrodes 650 or all the lower half sensing electrodes 660 and the pixel refreshing current are almost consistent.

Besides, in some in-cell type of touch sensitive liquid crystal display (LCD) 620, the driving electrodes 122 may be used together with the common electrodes of the LCD. The advantage of this part may refer to USPA No. 2014/0071360.

Figure 8A:
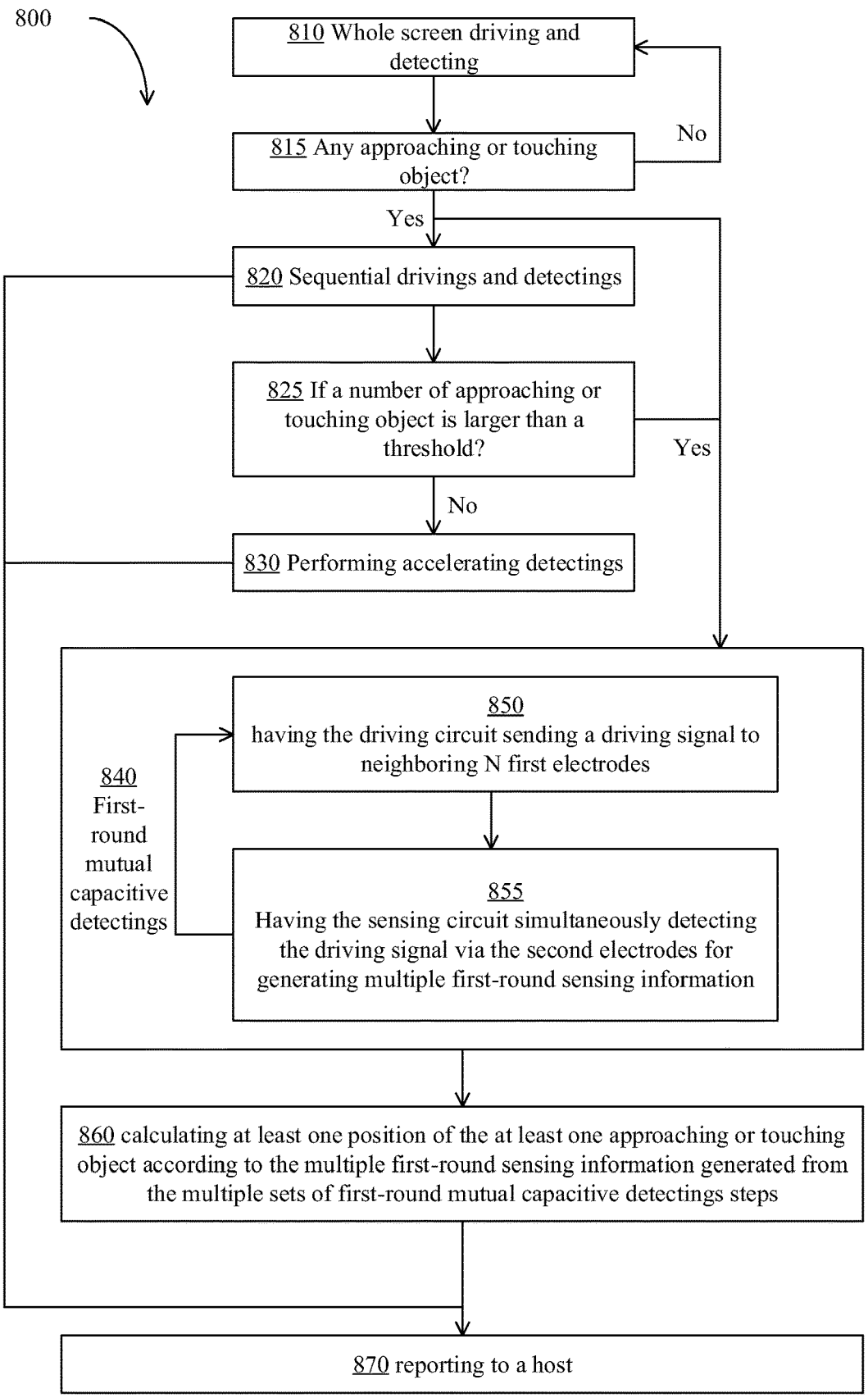
FIGS. 8A-8C show multiple flowcharts for touch sensitive processing method 800 according to embodiments of the present invention.
Figure 8B:
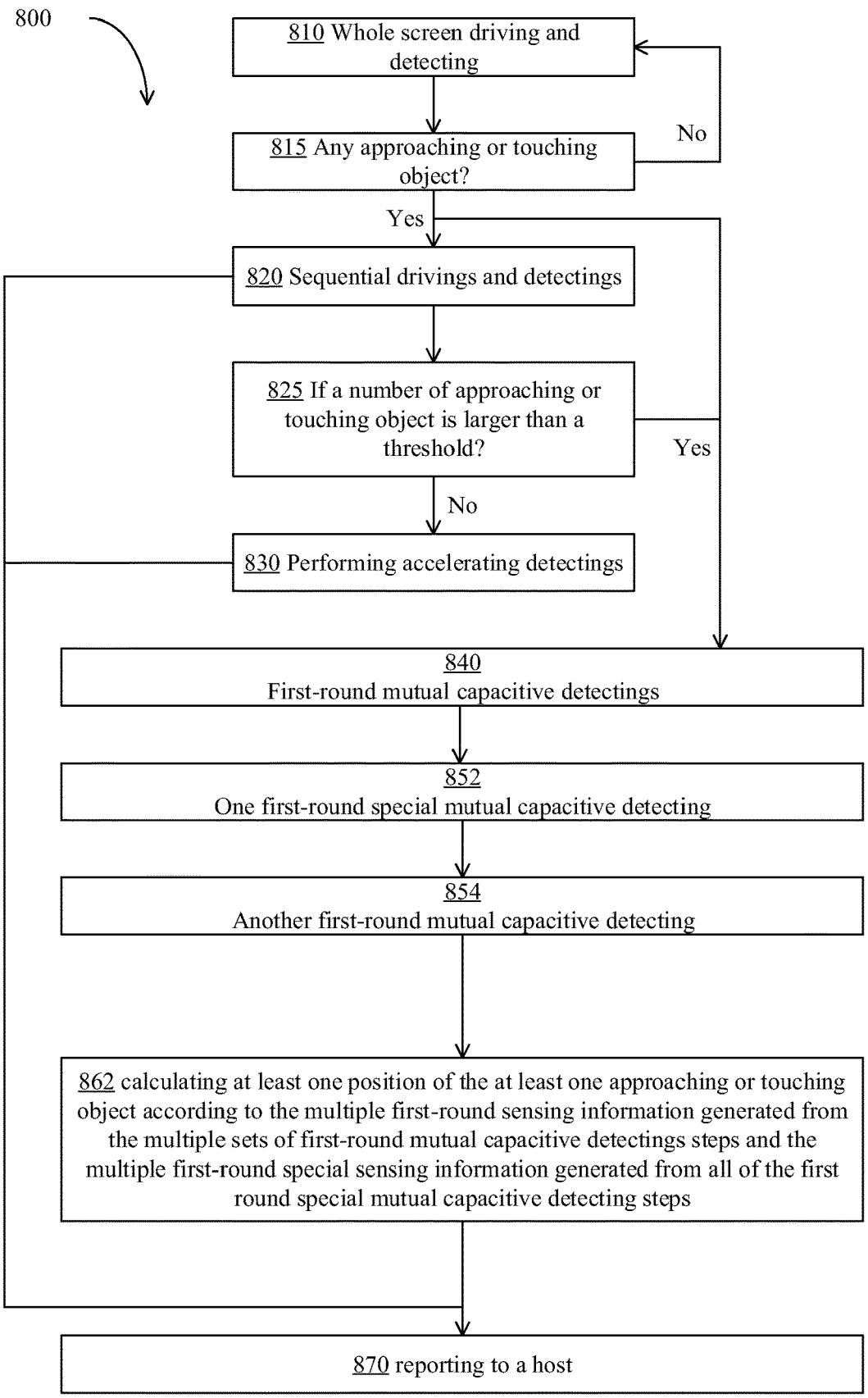
Figure 8C:
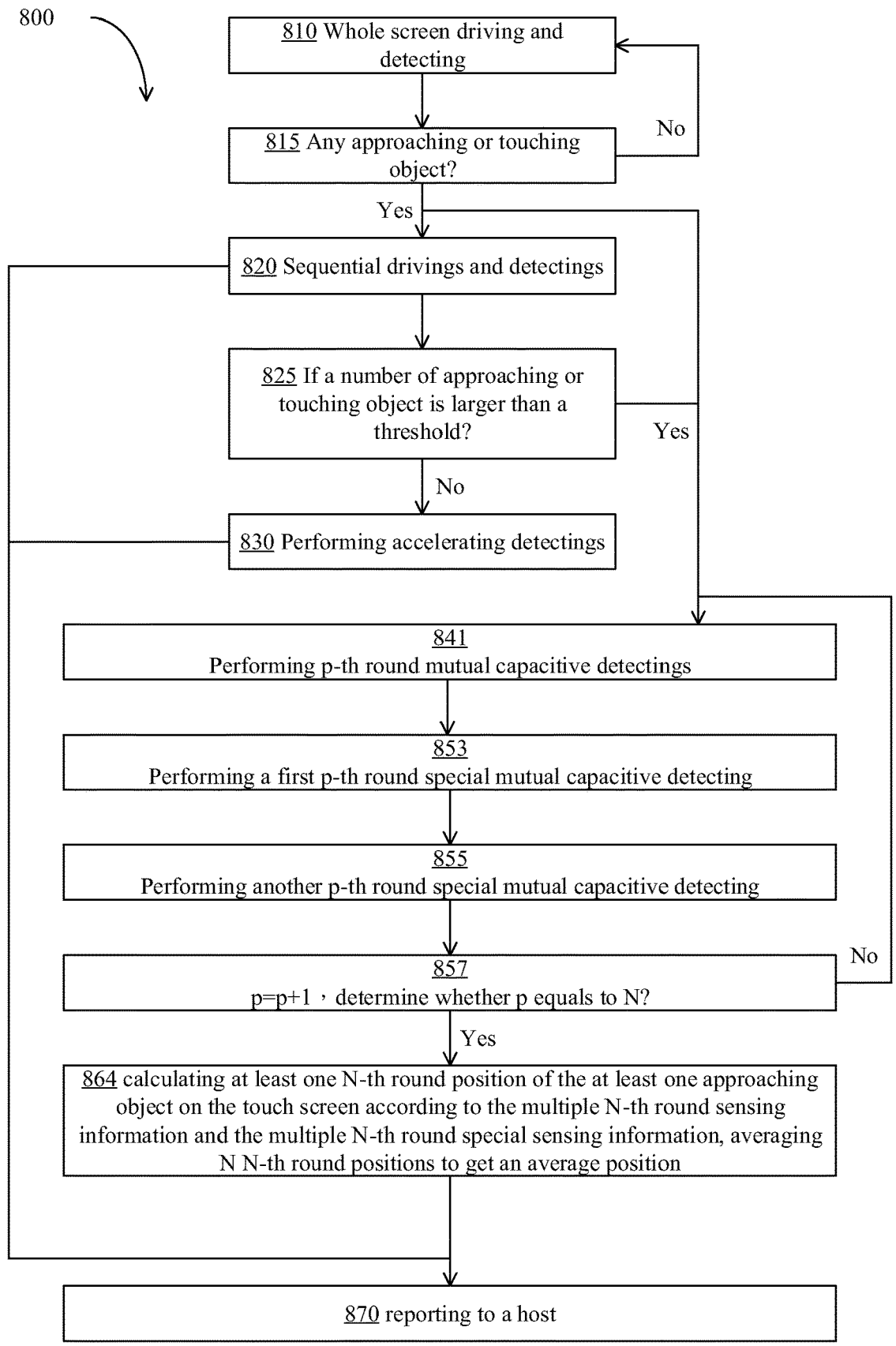

Referring to FIGS. 8A-8C, multiple flowcharts for touch sensitive processing method 800 according to embodiments of the present invention are illustrated. The touch sensitive processing method 800 may be adaptive to the touch sensitive processing apparatus 130 shown in FIG. 1, and can also be used to further explain the embodiments of FIGS. 2-5. The touch sensitive processing apparatus may include: a driving circuit, connecting to multiple first electrodes; a sensing circuit, connecting to multiple second electrodes; and a processor, connecting to the driving circuit and the sensing circuit. The driving circuit may include frequency signal generator, frequency adjustment circuit, voltage-voltage converter, signal amplifier, and so on. The sensing circuit may include frequency signal generator, frequency adjustment circuit, integral circuit, analog to digital converter, variable resistor, signal amplifier, and so forth. A person with ordinary skill in the art can appreciate the common implementations of the driving circuit and the sensing circuit. There have been billions of consumer electronics having touch screen and touch panel, and the touch sensitive processing apparatuses thereof all have the abovementioned driving circuit and sensing circuit. The following refers to FIG. 8A.

In optional step 810: whole screen driving and detecting, as those shown in the far left of FIG. 4 and FIG. 5. The whole or full screen driving and detecting further includes: having the driving circuit simultaneously sending the driving signal to all the first electrodes; having the sensing circuit simultaneously detecting the driving signal via the second electrodes for generating one-dimensional sensing information with respective to and formed by multiple sensing information; and determining if at least one approaching object approximates the touch screen according to the one-dimensional sensing information.

In optional step 815: determining if at least one approaching or touching object approximates the touch screen according to the detecting result of step 810. When the approaching object is determined, the flow can be continued to optional step 820 or to step 840. When there is no approaching or touching object, step 810 can be performed again later.

In optional step 820: executing a sequential drivings and detecting step as those shown in FIG. 4 and FIG. 5. The sequential or individual drivings and detectings step further includes: having the driving circuit sending in turn the driving signal to all the first electrodes in a time division manner; having the sensing circuit simultaneously detecting the driving signal via the second electrodes when each of the first electrodes sends the driving signal for generating two-dimensional sensing information with respective to and formed by multiple sensing information; and determining a number of and a position of object approaching or touching the touch screen according to the two-dimensional sensing information. Next, the flow continues to step 870 or to optional step 825.

In optional step 825: determining if a number of approaching or touching object is bigger than a threshold according to the detecting result of the sequential drivings and detectings step. When the number of approaching or touching object is not larger than the threshold, step 830 may be performed, otherwise step 840 is performed.

In optional step 830: performing accelerating detecting corresponding to the object as those shown in FIG. 4. After getting the result of the accelerating detecting, step 870 is performed.

In step 840: first round mutual capacitive detecting. As mentioned before, the value of N can be set, and all of the first electrodes are divided into groups by N. Mutual capacitive detecting is performed by group until all sets are detected. The flow continues to step 860. Each set of the first round mutual capacitive detecting step further includes: step 850, having the driving circuit sending a driving signal to neighboring N first electrodes, where N is a positive integer larger than 1; and step 855, having the sensing circuit simultaneously detecting the driving signal via the second electrodes for generating multiple first round sensing information with respective to the set of first round mutual capacitive detecting step, wherein each of the first round sensing information is corresponding to an intersection of central line of the N first electrodes and the second electrode In step 860: calculating at least one position of the at least one approaching or touching object on the touch screen according to the multiple first round sensing information generated from the multiple sets of first round mutual capacitive detecting steps. Next, step 870 is performed.

In step 870: reporting the at least one position getting from step 860 to a host.

The following refers to FIG. 8B, the steps 810-840 in FIG. 8B are the same as those shown in FIG. 8A, and they will not be described again. The embodiment of FIG. 8A is adaptive to that the number of the first electrode is even. The embodiments of FIG. 8B and FIG. 8C are adaptive to that the number of the first electrode is odd.

In step 852: at least one first round special mutual capacitive detecting step, including: having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps; having the sensing circuit simultaneously detecting the driving signal via the second electrodes for generating multiple first round special sensing information with respective to the set of first round special mutual capacitive detecting step, wherein each of the first round special sensing information is corresponding to an intersection of central line of the $M_1$ first electrodes and the second electrode, wherein the processor directs to and adjusts one of or any combination of parameters to make detecting strengths of the second electrode with respective to the $M_1$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit. The flow may continue to optional step 854 or to step 862.

In optional step 854: executing another first round special mutual capacitive detecting step, including: having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps; having the sensing circuit simultaneously detecting the driving signal via the second electrodes for generating multiple first round special sensing information with respective to the set of first round special mutual capacitive detecting step, wherein each of the first round special sensing information is corresponding to an intersection of central line of the $M_2$ first electrodes and the second electrode, wherein the processor directs to and adjusts one of or any combination of parameters to make detecting strengths of the second electrode with respective to the $M_2$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit. Next, step 862 is performed. The present invention dose not limited to the executing order of steps 840, 852, and 854.

In step 862: calculating at least one first round position of the at least one approaching object on the touch screen according to the multiple first round sensing information generated from the multiple sets of first round mutual capacitive detecting steps and the multiple first round special sensing information generated from all of the first round special mutual capacitive detecting steps. Next, step 870 is performed.

Referring to FIG. 8C, the steps 810-840 and 870 in FIG. 8C are the same as those shown in FIG. 8A, and they will not be described again. The main difference between FIG. 8C and FIG. 8B is that it only performs one round detecting and then reports the position to the host in FIG. 8B. In FIG. 8C, it performs multiple round detecting and then reports the position to the host. Therefore, the error of position can be reduced, and the rate of reporting after N-th round is equal to the rate of reporting in FIG. 8B. The value of p is set to an initial value to 1 before performing step 841.

In step 841: performing p-th round mutual capacitive detecting, where p is a positive integer from 1 to N. Step 841 is basically the same as step 840. Next, step 853 is performed.

In step 853: performing first p-th special mutual capacitive detecting, the step is basically the same as step 852. Next, optional step 855 is performed or step 857 is subsequently performed.

In step 855: performing another p-th special mutual capacitive detecting, the step is basically the same as step 854. Next, step 857 is performed.

In step 857: adding one to the value of p, determining if N round detecting is finished. If not, returning to perform step 841. If yes, performing step 864.

In step 864: calculating at least one N-th round position of the at least one approaching object on the touch screen according to the multiple N-th round sensing information and the multiple N-th round special sensing information, averaging N N-th round positions to get an average position. Next, performing step 870, reporting the average position to a host.

Figure 9:
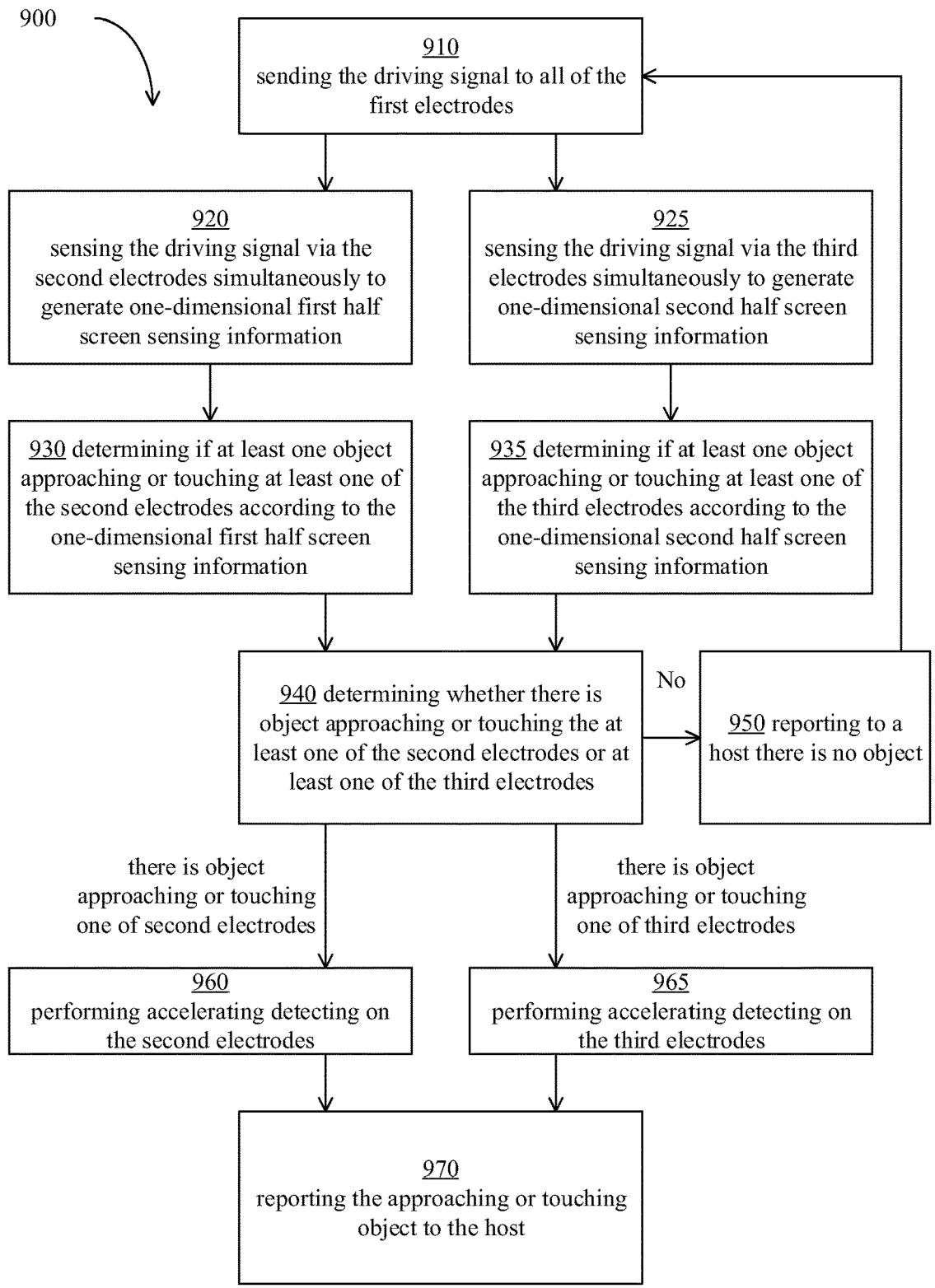
FIG. 9 illustrates a flowchart of a touch sensitive processing method according to an embodiment of the present invention.

Referring to FIG. 9, a flowchart of a touch sensitive processing method according to one embodiment of the present invention is illustrated. The touch sensitive processing method 900 may be adapted to the touch sensitive processing apparatus 630 shown in FIG. 6 and be used to detect if any approaching object approximates the touch screen 620. The touch screen includes multiple first electrodes 122A-K being parallel to a first axis, multiple second electrodes 650 being parallel to a second axis, and multiple third electrodes 660 being parallel to the second axis, wherein each of the first electrodes 122 is arranged to be spanned on the touch screen 620 and intersects with the second electrodes 650 or the third electrodes 660 to form multiple intersection areas. The touch sensitive processing apparatus includes: a driving circuit, connecting to the first electrodes, respectively; a sensing circuit, connecting to the second electrodes and the third electrodes, respectively; and a processor, configured to connect to the driving circuit and the sensing circuit. The processor may seem to a procedure module configured for executing the following steps:

In step 910: sending the driving signal to all of the first electrodes, for example, having the driving circuit sending the driving signal to all of the first electrodes 122A-K. Next steps 920 and 925 are performed at the same time.

In step 920: sensing the driving signal via the second electrodes simultaneously to generate one-dimensional first half screen sensing information, for example, having the sensing circuit simultaneously sensing the driving signal via the second electrodes 650. Next, step 930 is performed.

In step 925: sensing the driving signal via the third electrodes simultaneously to generate one-dimensional second half screen sensing information, for example, having the sensing circuit simultaneously sensing the driving signal via the third electrodes 660. Next, step 935 is performed.

In step 930: determining if at least one object approaching or touching at least one of the second electrodes according to the one-dimensional first half screen sensing information. The one-dimensional first half screen sensing information will change when the object approaching or touching at least one of the second electrodes 650. Next, step 940 is performed.

In step 935: determining if at least one object approaching or touching at least one of the third electrodes according to the one-dimensional second half screen sensing information. The one-dimensional second half screen sensing information will change when the object approaching or touching at least one of the third electrodes 660. Next, step 940 is performed.

In step 940: determining whether there is object approaching or touching the at least one of the second electrodes or at least one of the third electrodes. Step 950 is performed when there is no approaching object. Step 960 is performed when there is object approaching or touching at least one of the second electrodes. Step 965 is performed when there is object approaching or touching at least one of the third electrodes. Steps 960 and 965 may be performed at the same time when the object concurrently approaching at least one of the second electrodes and at least one of the third electrodes. The steps 960 and 965 could be the accelerating sensing ways 720, 730, and 740 shown in the FIG. 7. Step 960 may be performed soly when the object only approaching or touching at least one of the second electrodes. Step 965 may be performed solely when the object only approaching or touching at least one of the third electrodes.

In step 950: reporting to a host there is no approaching or touching object. Next, waiting for a while and returning to step 910.

In step 960: performing accelerating detecting on the second electrodes, for example, following the accelerating detecting ways 720, 730 or 740 of FIG. 7, performing individual detecting or N round detecting in order or in random to detect the first electrodes 122A-F. Next, step 970 is performed.

In step 965: performing accelerating detecting on the third electrodes, for example, following the accelerating detecting ways 720, 730 or 740 of FIG. 7, performing individual detecting or N round detecting in order or in random to detect the first electrodes 122G-K. Next, step 970 is performed.

In step 970: reporting the approaching or touching object to the host according to the detecting result of step 960 and/or step 965. When this is done, it waits a while and returns to step 910, or repeats step 960 and/or 965 several times and then returns to step 910.

Figure 10:
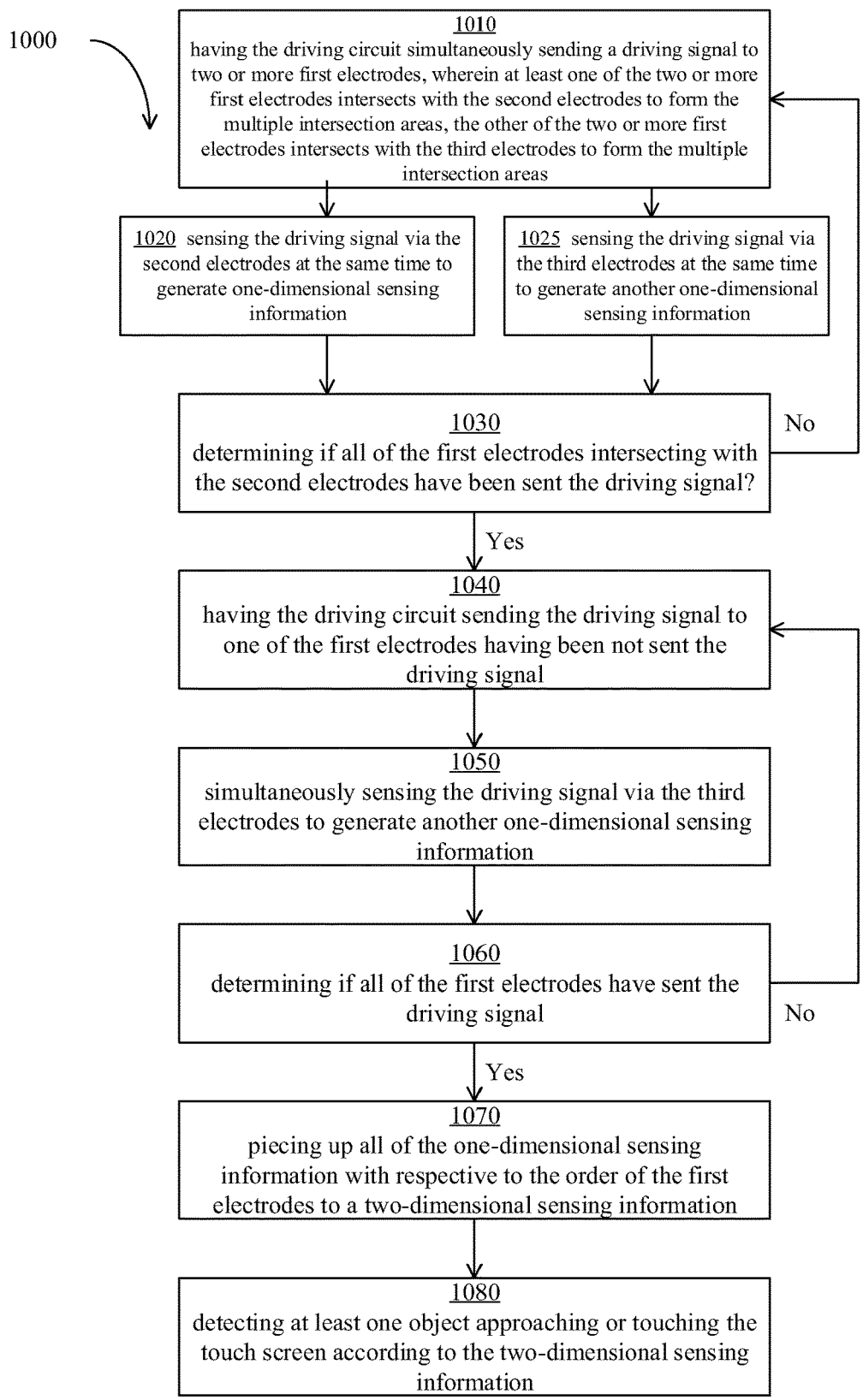
FIG. 10 illustrates a flowchart of a touch sensitive processing method according to an embodiment of the present invention.

Referring to FIG. 10, a flowchart of a touch sensitive processing method according to one embodiment of the present invention is illustrated. The touch sensitive processing method 1000 may be adapted to the touch sensitive processing apparatus 630 shown in FIG. 6 and be used to detect if any object approaching or touching the touch screen 620. The touch screen 620 includes multiple first electrodes 122A-K being parallel to a first axis, multiple second electrodes 650 being parallel to a second axis, and multiple third electrodes 660 being parallel to the second axis, wherein each of the first electrodes 122 is arranged to be spanned on the touch screen 620 and intersects with the second electrodes 650 or the third electrodes 660 to form multiple intersection areas. The touch sensitive processing apparatus includes: a driving circuit, connecting to the first electrodes 122, respectively; a sensing circuit, connecting to the second electrodes 650 and the third electrodes 660, respectively; and a processor, configured to connect to the driving circuit and the sensing circuit. The processor may seem to a procedure module configured for executing the following steps:

In step 1010: having the driving circuit simultaneously sending a driving signal to two or more first electrodes 122, wherein at least one of the two or more first electrodes 122 intersects with the second electrodes 660 to form the multiple intersection areas, the other of the two or more first electrodes 122 intersects with the third electrodes 650 to form the multiple intersection areas. When step 1010 is performed, steps 1020 and 1025 are performed at the same time.

In step 1020: sensing the driving signal via the second electrodes at the same time to generate one-dimensional sensing information. Next, step 1030 is performed.

In step 1025: sensing the driving signal via the third electrodes at the same time to generate another one-dimensional sensing information. Next, step 1030 is performed.

In step 1030: determining if all of the first electrodes intersecting with the second electrodes have been sent the driving signal? If any first electrode intersecting with the second electrodes has not been sent the driving signal, the flow returns to step 1010, otherwise performing step 1040. In other words, when the number of the first electrodes intersecting with the second electrodes is smaller the that of the third electrodes intersecting with the first electrodes, determining that if the first electrodes intersecting with the second electrodes have sent the driving signal is performed. When the first electrodes intersecting with the second electrodes have already sent the driving signal, individual detecting step to the first electrodes intersecting with the third electrodes is singly performed.

In step 1040: having the driving circuit sending the driving signal to one of the first electrodes having been not sent the driving signal. At the same time, step 1050 is performed.

In step 1050: simultaneously sensing the driving signal via the third electrodes to generate another one-dimensional sensing information. Next, step 1060 is performed.

In step 1060: determining if all of the first electrodes have sent the driving signal. In other words, when the number of the second electrodes intersecting with the first electrodes is smaller the that of the third electrodes intersecting with the first electrodes, determining that if the first electrodes intersecting with the third electrodes have sent the driving signal is performed. If yes, the flow continues to step 1070, otherwise returns to step 1040.

In step 1070: piecing up all of the one-dimensional sensing information with respective to the order of the first electrodes to a two-dimensional sensing information. In other words, piecing up all of the one-dimensional sensing information generated from steps 1020, 1025, and 1050 with respective to the order of the first electrodes to the two-dimensional sensing information. Next, step 1080 is performed.

In step 1080: detecting at least one object approaching or touching the touch screen according to the two-dimensional sensing information.

Figure 11A:
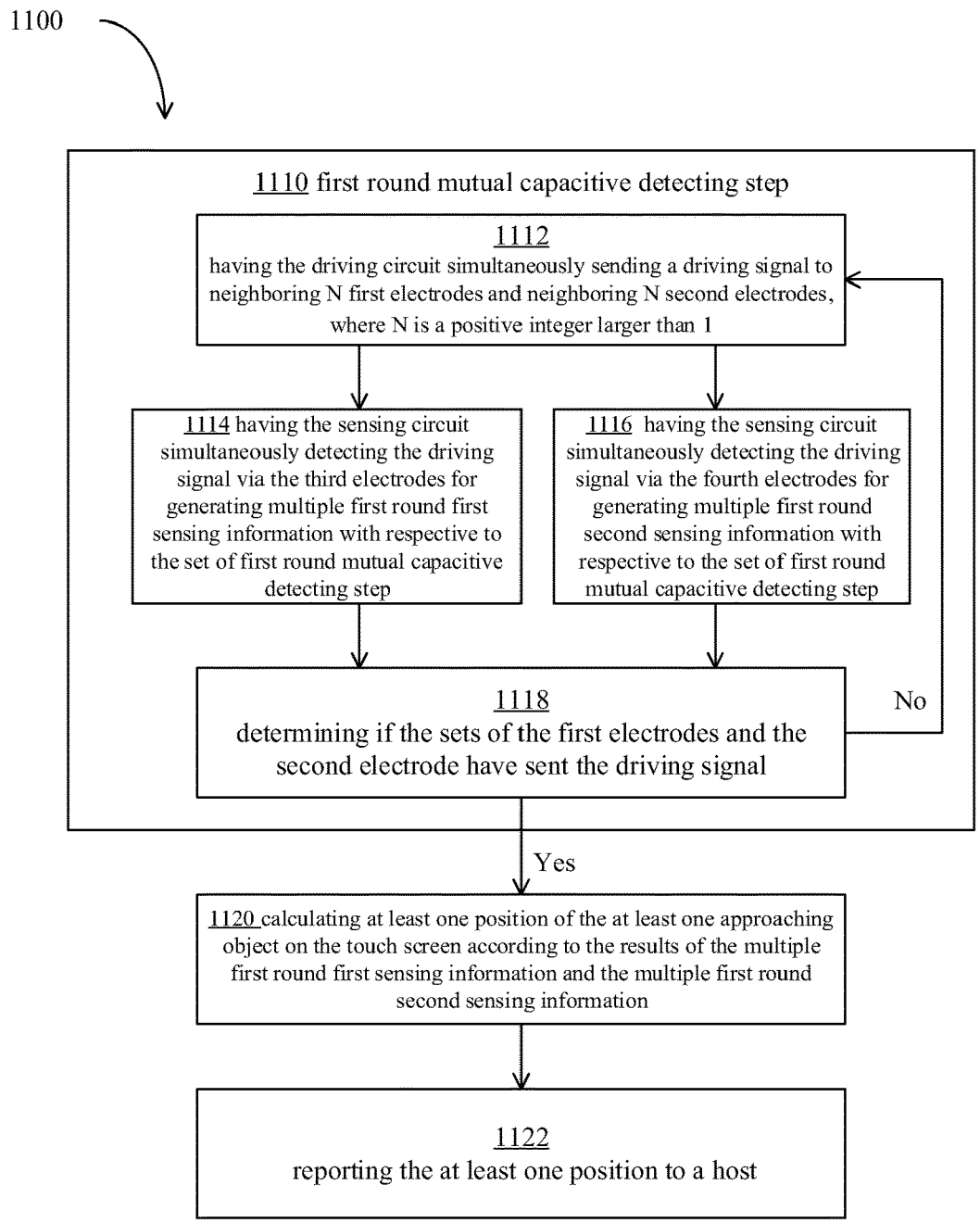
FIGS. 11A-11D illustrates flowcharts of a touch sensitive processing method according to an embodiment of the present invention.

Referring to FIG. 11A, a flowchart of a touch sensitive processing method according to one embodiment of the present invention is illustrated. The touch sensitive processing method 1100 may be adapted to the touch sensitive processing apparatus 630 shown in FIG. 6 and be used to detect any object approaching or touching the touch screen 620.

The touch screen 620 includes multiple neighboring first electrodes 122A-F and multiple neighboring second electrodes 122G-K parallel to a first axis, multiple neighboring third electrodes 650 and multiple neighboring fourth electrodes 660 parallel to a second axis, wherein each of the first electrodes 122A-F intersects with the third electrodes 650 to form multiple intersection areas, each of the second electrodes 122G-K intersects with the fourth electrodes 660 to form multiple intersection areas. The touch sensitive processing apparatus includes: a driving circuit, connecting to the first electrodes 122A-F and the second electrodes 122G-K, respectively; a sensing circuit, connecting to the third electrodes 650 and the fourth electrodes 660, respectively; and a processor, configured to connect to the driving circuit and the sensing circuit. The processor is configured for executing the following steps:

In step 1110: p-th round mutual capacitive detecting step used for performing mutual capacitive driving and detecting to groups of first electrodes and second electrodes, where p is a positive integer. When first round is performed, step 1110 is a first round mutual capacitive detecting step, it may further include the following steps.

In step 1112: having the driving circuit simultaneously sending a driving signal to neighboring N first electrodes and neighboring N second electrodes, where N is a positive integer larger than 1. At the same time, steps 1114 and 1116 are performed.

In step 1114: having the sensing circuit simultaneously detecting the driving signal via the third electrodes for generating multiple first round first sensing information with respective to the set of first round mutual capacitive detecting step, wherein each of the first round first sensing information is corresponding to an intersection of central line of the N first electrodes and the third electrode.

In step 1116: having the sensing circuit simultaneously detecting the driving signal via the fourth electrodes for generating multiple first round second sensing information with respective to the set of first round mutual capacitive detecting step, wherein each of the first round second sensing information is corresponding to an intersection of central line of the N second electrodes and the fourth electrode.

In step 1118: when a set of first electrodes and a set of second electrodes have performed steps 1114 and 1116, determining if the sets of the first electrodes and the second electrode have sent the driving signal. It yes, step 1120 is performed, otherwise returning to step 1112 for next set of first electrodes and next set of second electrodes.

In step 1120: calculating at least one position of the at least one approaching object on the touch screen according to the results of steps 1114 and 1116, that is, the multiple first round first sensing information and the multiple first round second sensing information generated from the multiple first round mutual capacitive detecting steps. Next, step 1122 is performed.

In step 1122: reporting the at least one position to a host.

Figure 11B:
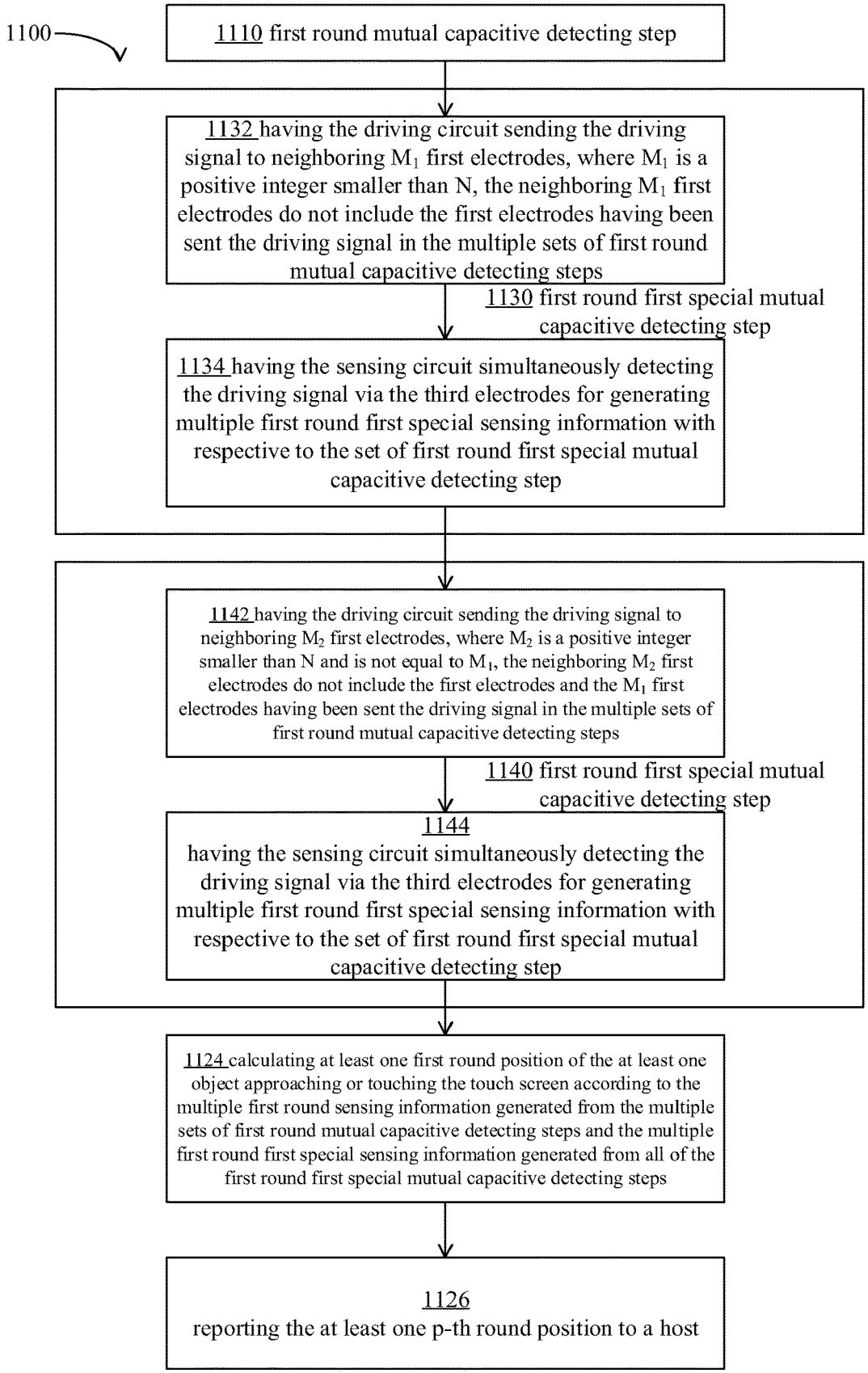

Referring to FIG. 11B, another flowchart of a touch sensitive processing method according to one embodiment of the present invention is illustrated. The flowchart shown in FIG. 11B is a varied flowchart of FIG. 11A, and if numerals are the same, it means the steps are the same as those shown in FIG. 11A, and they will not be described again. The processes shown in FIG. 11B are for the touch screen with the first electrodes being not able to gather into N neighboring first electrodes and further being not adjacent to each other. After performing step 1110, step 1130 is performed.

In step 1130: p-th round first special mutual capacitive detecting steps used for detecting neighboring first electrode being not able to gather into group. It further includes steps 1132 and 1134.

In step 1132: having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps. At the same time, step 1134 is performed.

In step 1134: having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of central line of the $M_1$ first electrodes and the third electrode. The processor directs to and adjusts one of or any combination of parameters to make detecting strengths of the third electrode with respective to the $M_1$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit. If there still have the first electrodes being not able to gather into groups, step 1140 may be performed again at least one time, otherwise step 1124 can be directly performed.

In step 1140: p-th round first special mutual capacitive detecting steps used for detecting neighboring first electrodes being not grouped. And further, the neighboring first electrodes are not adjacent to the first electrodes mentioned in step 1130. It further includes steps 1142 and 1144.

In step 1142: having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps. At the same time, step 1144 is performed.

In step 1144: having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of central line of the $M_2$ first electrodes and the third electrode. The processor directs to and adjusts one of or any combination of parameters to make detecting strengths of the third electrode with respective to the $M_2$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit. If there still has the first electrode having been not sent the driving signal, step 1140 may be performed again, or otherwise step 1124 is performed.

In step 1124: calculating at least one first round position of the at least one object approaching or touching the touch screen according to the multiple first round sensing information generated from the multiple sets of first round mutual capacitive detecting steps and the multiple first round first special sensing information generated from all of the first round first special mutual capacitive detecting steps, that is, calculating at least one first round position according to the sensing information getting from steps 1114, 1116, 1134, and 1144. Next, step 1126 is performed.

In step 1126: reporting the at least one first round position to a host.

Figure 11C:
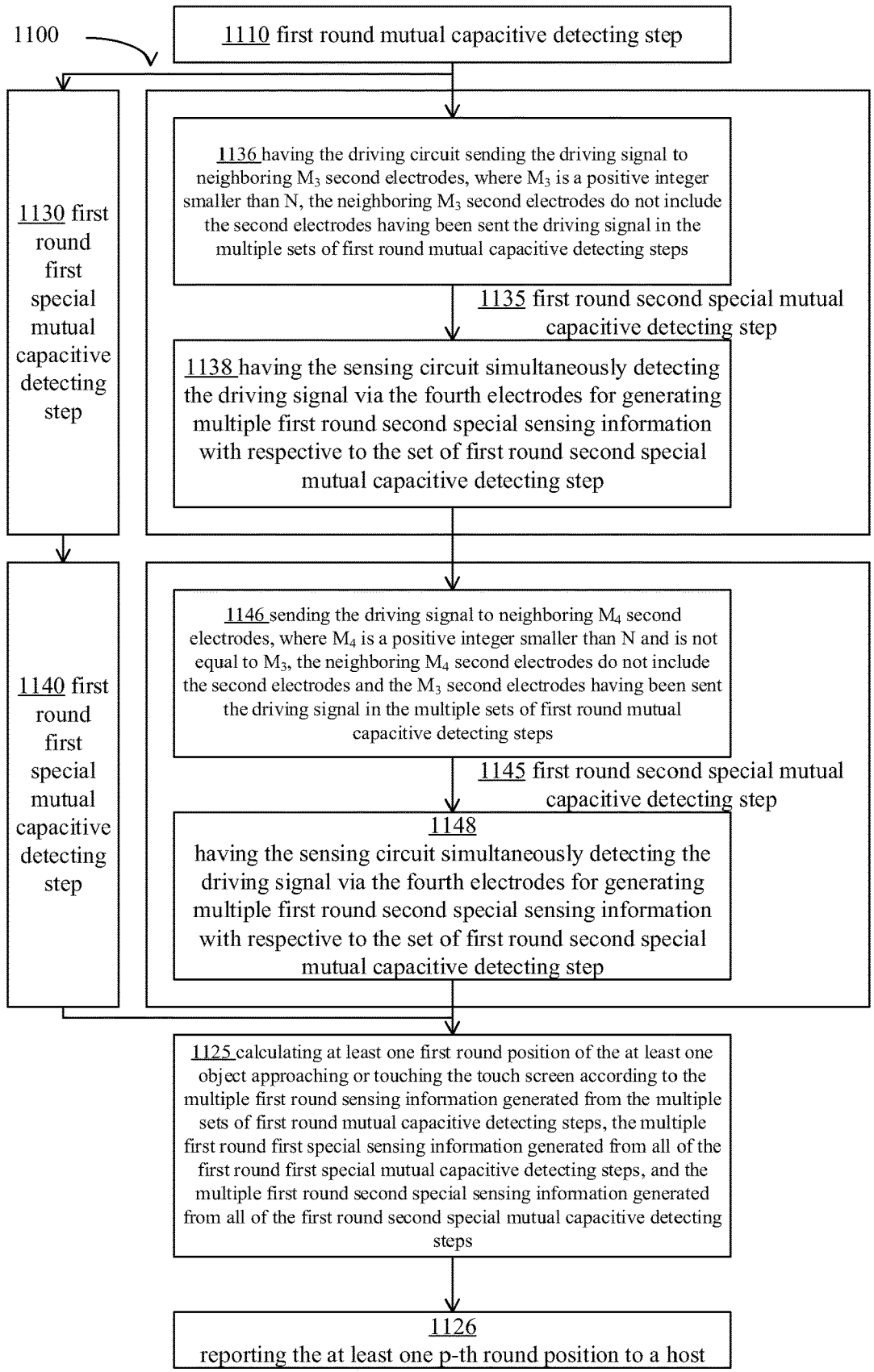

Referring to FIG. 11C, another flowchart of a touch sensitive processing method according to one embodiment of the present invention is illustrated. The flowchart shown in FIG. 11C is a varied flowchart of FIG. 11B, and if numerals are the same, it means the steps are the same as those shown in FIGS. 11A and 11B, and they will not be described again. The processes shown in FIG. 11C are for the touch screen with the second electrodes being not grouped into a N neighboring second electrodes and further being not adjacent to each other. After performing step 1110, steps 1130 and 1135 are performed.

In step 1135: p-th round second special mutual capacitive detecting steps used for detecting neighboring second electrodes being not able to gather into group. It further includes steps 1136 and 1138.

In step 1136: having the driving circuit sending the driving signal to neighboring $M_3$ second electrodes, where $M_3$ is a positive integer smaller than N, the neighboring $M_3$ second electrodes do not include the second electrodes having been sent the driving signal in the multiple sets of first round mutual capacitive detecting steps. At the same time, step 1138 is performed.

In step 1138: having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of central line of the $M_3$ second electrodes and the fourth electrode. The processor directs to and adjusts one of or any combination of parameters to make detecting strengths of the fourth electrode with respective to the $M_3$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit. If there still have the second electrodes being not able to gather into groups, step 1145 may be performed again at least one time, otherwise step 1125 can be directly performed.

In step 1145: p-th round second special mutual capacitive detecting steps used for detecting neighboring second electrodes being not able to gather into group. And further, the neighboring second electrodes are not adjacent to the second electrodes mentioned in step 1135. It further includes steps 1146 and 1148.

In step 1146: sending the driving signal to neighboring $M_4$ second electrodes, where $M_4$ is a positive integer smaller than N and is not equal to $M_3$, the neighboring $M_4$ second electrodes do not include the second electrodes and the $M_3$ second electrodes having been sent the driving signal in the multiple sets of first round mutual capacitive detecting steps. At the same time, step 1148 is performed.

In step 1148: having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of central line of the $M_4$ second electrodes and the fourth electrode. The processor directs to and adjusts one of or any combination of parameters to make detecting strengths of the fourth electrode with respective to the $M_4$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit. If there still has the second electrode having been not sent the driving signal, step 1145 may be performed again, or otherwise step 1125 is performed.

In step 1125: calculating at least one first round position of the at least one object approaching or touching the touch screen according to the multiple first round sensing information generated from the multiple sets of first round mutual capacitive detecting steps, the multiple first round first special sensing information generated from all of the first round first special mutual capacitive detecting steps, and the multiple first round second special sensing information generated from all of the first round second special mutual capacitive detecting steps. Next, step 1126 is performed.

Figure 11D:
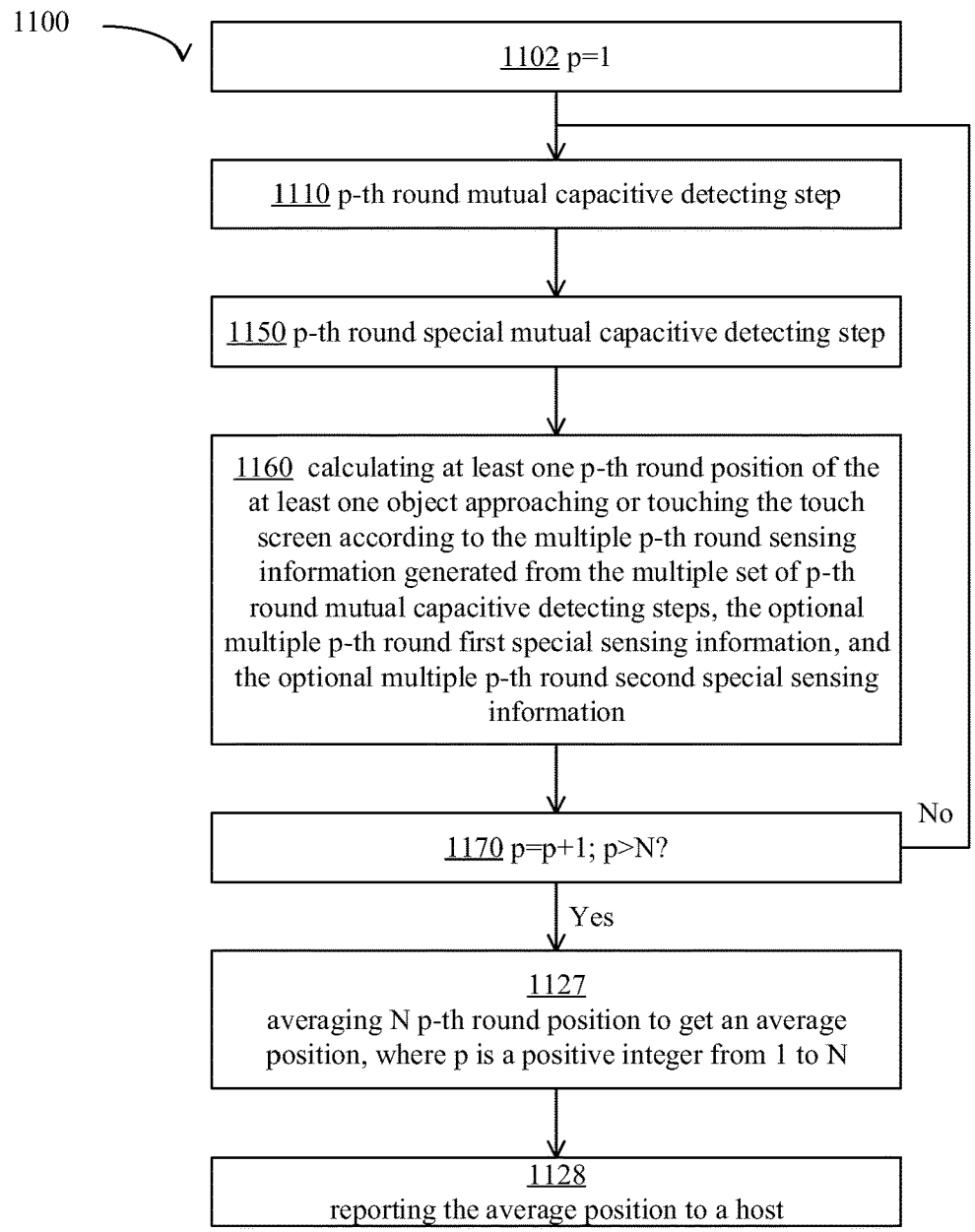

Referring to FIG. 11D, another flowchart of a touch sensitive processing method according to one embodiment of the present invention is illustrated. The flowchart shown in FIG. 11D is a varied flowchart of FIGS. 11A-C, and if numerals are the same, it means the steps are the same as those shown in FIGS. 11A-C, and they will not be described again. The processes shown in FIG. 11D is for calculating the approaching object's precise approaching or touching position in multiple round of detectings. Firstly, step 1102 is performed for initialization.

In step 1102: setting a variable p to 1, where p is a positive integer smaller than or equal to N. Next, step 1110 is performed.

Step 1110 of FIG. 11D is almost the same as step 1110 of FIGS. 11A-C, except for p of p-th round being considered to a variable. Multiple p-th round sensing information can be generated. Next, optional step 1150 is performed. When optional step 1150 is not performed, step 1160 is performed.

In step 1150: it may include steps 1130 and 1140 shown in FIG. 11B, or steps 1135 and 1145 shown in FIG. 11C. Multiple p-th round first special sensing information and/or multiple p-th round second sensing information can be generated. Next, step 1160 is performed.

In step 1160: calculating at least one p-th round position of the at least one object approaching or touching the touch screen according to the multiple p-th round sensing information generated from the multiple set of p-th round mutual capacitive detecting steps, the optional multiple p-th round first special sensing information, and the optional multiple p-th round second special sensing information. Next, step 1170 is performed.

In step 1170: adding 1 to variable p and determining if p is larger than N. If yes, the processes exit loop and performs step 1127, otherwise the processes returns to loop and performs step 1110.

In step 1127: averaging N p-th round position to get an average position, where p is a positive integer from 1 to N. Next, step 1128 is performed.

In step 1128: reporting the average position to a host.

To sum up, to use the mechanism provided by the present invention may speed up the reporting rate of approximating event to let user(s) keep the same or even have better experience in using the touch screen in big size.

According to one embodiment of the present invention, it provides a touch sensitive processing apparatus configured to connect to a touch screen and used to detect at least one object approximating or touching the touch screen. The touch screen includes multiple first electrodes being parallel to each other and multiple second electrodes being parallel to each other. Each of the first electrodes intersects with the second electrodes to form multiple intersection areas. The touch sensitive processing apparatus includes: a driving circuit, connecting to the first electrodes, respectively; a sensing circuit, connecting to the second electrodes, respectively; and a processor, configured to connect to the driving circuit and the sensing circuit. The processor is used for executing multiple sets of first round mutual capacitive detecting steps. Wherein each set of the first round mutual capacitive detecting step further includes: having the driving circuit sending a driving signal to neighboring N first electrodes, where N is a positive integer larger than 1; and having the sensing circuit simultaneously detecting the driving signal via the second electrodes for generating multiple first round sensing information with respective to the set of first round mutual capacitive detecting step. Each of the first round sensing information is corresponding to an intersection of central line of the N first electrodes and the second electrode.

In one embodiment, for calculating at least one position of at least one object, the processor is further used for: calculating at least one position of the at least one object on the touch screen according to the multiple first round sensing information generated from the multiple sets of first round mutual capacitive detecting steps; and reporting the position to a host.

In one embodiment, in response to the touch panel being not grouped into N neighboring first electrodes, the processor is further used for: executing at least one first round special mutual capacitive detecting step, including: having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps; and having the sensing circuit simultaneously detecting the driving signal via the second electrodes for generating multiple first round special sensing information with respective to the set of first round special mutual capacitive detecting step, wherein each of the first round special sensing information is corresponding to an intersection of central line of the $M_1$ first electrodes and the second electrode, wherein the processor directs to and adjusts one of or any combination of parameters to make detecting strengths of the second electrode with respective to the $M_1$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, in response to the touch panel being not grouped into N neighboring first electrodes ungrouped first electrodes are further not adjacent to each other, the processor is further used for: executing another first round special mutual capacitive detecting step, including: having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps; and having the sensing circuit simultaneously detecting the driving signal via the second electrodes for generating multiple first round special sensing information with respective to the set of first round special mutual capacitive detecting step, wherein each of the first round special sensing information is corresponding to an intersection of central line of the $M_2$ first electrodes and the second electrode, wherein the processor directs to and adjusts one of or any combination of parameters to make detecting strengths of the second electrode with respective to the $M_2$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating at least one position of at least one object, the processor is further used for: calculating at least one first round position of the at least one object on the touch screen according to the multiple first round sensing information generated from the multiple sets of first round mutual capacitive detecting steps and the multiple first round special sensing information generated from all of the first round special mutual capacitive detecting steps; and reporting the first round position to a host.

In one embodiment, for compensating inaccuracy resulting from one round sensing information, multiple round detecting is performed to increase the accuracy of the approximating position. The processor is further used for: executing iteratively the following steps for N−1 times: executing multiple X-th round mutual capacitive detecting steps, where X is a positive integer from 2 to N, wherein each of the X-th round mutual capacitive detecting steps includes: having the driving circuit simultaneously sending the driving signal to neighboring N first electrodes, where N is a positive integer larger than 1; and having the sensing circuit simultaneously detecting the driving signal via the second electrodes for generating multiple X-th round sensing information with respective to the set of X-th round mutual capacitive detecting step, wherein each of the X-th round sensing information is corresponding to an intersection of central line of the N first electrodes and the second electrode; and executing one X-th round special mutual capacitive detecting step, including: having the driving circuit sending the driving signal to neighboring $M_x$ first electrodes, where $M_x$ is a positive integer smaller than N, the neighboring $M_x$ first electrodes do not include the first electrodes having been sent the driving signal in the multiple sets of X-th round mutual capacitive detecting steps; and having the sensing circuit simultaneously detecting the driving signal via the second electrodes for generating multiple X-th round special sensing information with respective to the set of X-th round special mutual capacitive detecting step, wherein each of the X-th round special sensing information is corresponding to an intersection of central line of the $M_x$ first electrodes and the second electrode, wherein the processor directs to and adjusts one of or any combination of parameters to make detecting strengths of the second electrode with respective to the $M_x$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating more precise approximating or touching position of the object in multiple round detecting, the processor is further used for: executing iteratively the following steps for N times to get N p-th round position of the at least one object on the touch screen: calculating at least one p-th round position of the at least one object approaching or touching the touch screen according to the multiple p-th round sensing information and the multiple p-th round special sensing information; averaging N p-th round positions to get an average position; and reporting the average position to a host.

In one embodiment, in response to the touch panel being not grouped into N neighboring first electrodes ungrouped first electrodes are further not adjacent to each other, the neighboring $M_p$ first electrodes and the neighboring $M_q$ first electrodes include different first electrodes, where p and q are different positive integers ranging from 1 to N.

In one embodiment, in response to the touch panel being not grouped into N neighboring first electrodes, the value of $M_p$ is the same as the value of $M_q$, where p and q are different positive integers ranging from 1 to N.

In one embodiment, for reducing EMI with other adjacent parts or electronic apparatuses, the neighboring $M_p$ first electrodes are selected in random, where p is a positive integer from 1 to N.

In one embodiment, for simplifying algorithm, the neighboring $M_1$ first electrodes are the $M_1$ first electrodes near one edge of the touch screen, the neighboring $M_N$ first electrodes are the $M_N$ first electrodes near the other edge of the touch screen.

In one embodiment, for averaging EMI resulting from pixel refreshing to the sensing circuit or letting EMI of the driving signal being evenly distributed over the pixel horizontal axis, the first electrodes are parallel to the pixel horizontal axis of the touch screen. In one embodiment, for reducing the thickness of the touch screen, the touch screen is an in-cell touch LCD screen, a common electrode of the touch screen includes at least one first electrode.

In one embodiment, for speeding up the rate of reporting object, the processor is further used for: executing a whole-screen-driving detecting step before executing the multiple sets of first round mutual capacitive detecting steps; and executing the multiple sets of first round mutual capacitive detecting steps when the at least one approaching object is detected by the whole-screen-driving detecting step. In the embodiment, the processor is further used for: executing a sequential driving detecting step before executing the multiple sets of first round mutual capacitive detecting steps; and executing the multiple sets of first round mutual capacitive detecting steps when the number of the approaching object detected by the sequential driving detecting step is bigger than a threshold. In the embodiment, the whole-screen-driving detecting step further includes: having the driving circuit simultaneously sending the driving signal to all the first electrodes; having the sensing circuit simultaneously detecting the driving signal via the second electrodes for generating one-dimensional sensing information with respective to and formed by multiple sensing information; and determining if at least one approaching object approximates the touch screen according to the one-dimensional sensing information. In the embodiment, the sequential driving detecting step further includes: having the driving circuit alternatively sending the driving signal to all the first electrodes in time division; having the sensing circuit simultaneously detecting the driving signal via the second electrodes when each of the first electrodes sends the driving signal for generating two-dimensional sensing information with respective to and formed by multiple sensing information; and determining a number of and a position of the approaching object approximating or touching the touch screen according to the two-dimensional sensing information.

The present invention does not limit the executing order of the p-th round special mutual capacitive detecting steps and the p-th round mutual capacitive detecting steps, where p is a positive integer from 1 to N. In one embodiment, the p-th round special mutual capacitive detecting steps may be executed at first and then the p-th round mutual capacitive detecting steps are executed. In another embodiment, the p-th round mutual capacitive detecting steps may first be executed and then the p-th round special mutual capacitive detecting steps are executed. In further one embodiment, a part of the p-th round mutual capacitive detecting steps may first executed, next the p-th round special mutual capacitive detecting steps are executed, and then the other parts of the p-th round mutual capacitive detecting steps are executed and finished.

The present invention does not limit the executing number of the p-th round special mutual capacitive detecting steps in the p-th round. In one embodiment, assumed N=3, the value of $M_p$ may be 1. In other words, the special mutual capacitive detecting steps may be executed two times in one round. Each time of the special mutual capacitive detecting steps use single first electrode to send a driving signal. In another embodiment, assumed N=4, the value of $M_p$ may be 1. In other words, the special mutual capacitive detecting steps may be executed three times in one round. Each time of the special mutual capacitive detecting steps use single first electrode to send the driving signal.

Further, the present invention does not limit whether the numbers of the first electrodes used by multiple the p-th round special mutual capacitive detecting steps in the p-th round are the same. In one embodiment, assumed N=4, the p-th round special mutual capacitive detecting steps may be executed one time and single first electrode is used to send the driving signal. Another p-th round special mutual capacitive detecting steps may also be executed and two adjacent first electrodes are used to send the driving signal. In other words, in the same round of the p-th round special mutual capacitive detecting steps, they may use different numbers of the first electrodes.

According to one embodiment of the present invention, it provides an electronic system used to detect at least one approaching object approximating or touching a touch screen. The electronic system includes the touch screen and a touch sensitive processing apparatus connecting to the touch screen. The features of the touch screen and the touch sensitive processing apparatus connecting to the touch screen are described as above.

According to one embodiment of the present invention, it provides a touch sensitive processing method adaptive to a touch sensitive processing apparatus configured to connect to a touch screen and used to detect at least one approaching object approximating or touching the touch screen. Wherein the touch screen includes multiple first electrodes being parallel to each other and multiple second electrodes being parallel to each other. Each of the first electrodes intersects with the second electrodes to form multiple intersection areas. The touch sensitive processing method includes: executing multiple sets of first round mutual capacitive detecting steps, wherein each set of the first round mutual capacitive detecting step further includes: having a driving circuit sending a driving signal to neighboring N first electrodes, where N is a positive integer larger than 1; and having a sensing circuit simultaneously detecting the driving signal via the second electrodes for generating multiple first round sensing information with respective to the set of first round mutual capacitive detecting step. Wherein each of the first round sensing information is corresponding to an intersection of central line of the N first electrodes and the second electrode.

In one embodiment, for calculating at least one approximating position of at least one approaching object, the touch sensitive processing method further includes: calculating at least one position of the at least one object approaching or touching the touch screen according to the multiple first round sensing information generated from the multiple sets of first round mutual capacitive detecting steps; and reporting the position to a host.

In one embodiment, in response to the touch panel being not grouped into N neighboring first electrodes, the touch sensitive processing method further includes: executing at least one first round special mutual capacitive detecting step, including: having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps; and having the sensing circuit simultaneously detecting the driving signal via the second electrodes for generating multiple first round special sensing information with respective to the set of first round special mutual capacitive detecting step, wherein each of the first round special sensing information is corresponding to an intersection of central line of the $M_1$ first electrodes and the second electrode, wherein the touch sensitive processing method directs to and adjusts one of or any combination of parameters to make detecting strengths of the second electrode with respective to the $M_1$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, in response to the touch panel being not grouped into N neighboring first electrodes and ungrouped first electrodes are further not adjacent to each other, the touch sensitive processing method further includes: having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps; and having the sensing circuit simultaneously detecting the driving signal via the second electrodes for generating multiple first round special sensing information with respective to the set of first round special mutual capacitive detecting step, wherein each of the first round special sensing information is corresponding to an intersection of central line of the $M_2$ first electrodes and the second electrode, wherein the touch sensitive processing method directs to and adjusts one of or any combination of parameters to make detecting strengths of the second electrode with respective to the $M_2$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating at least one approximating position of at least one approaching object, the touch sensitive processing method further includes: calculating at least one first round position of the at least one object approaching or touching the touch screen according to the multiple first round sensing information generated from the multiple sets of first round mutual capacitive detecting steps and the multiple first round special sensing information generated from all of the first round special mutual capacitive detecting steps; and reporting the first round position to a host.

In one embodiment, for compensating inaccuracy resulting from one round sensing information, multiple round detecting is performed to increase the accuracy of the approximating position. The touch sensitive processing method further includes: executing iteratively the following steps for N−1 times: executing multiple X-th round mutual capacitive detecting steps, where X is a positive integer from 2 to N, wherein each of the X-th round mutual capacitive detecting steps includes: having the driving circuit simultaneously sending the driving signal to neighboring N first electrodes, where N is a positive integer larger than 1; and having the sensing circuit simultaneously detecting the driving signal via the second electrodes for generating multiple X-th round sensing information with respective to the set of X-th round mutual capacitive detecting step, wherein each of the X-th round sensing information is corresponding to an intersection of central line of the N first electrodes and the second electrode; and executing one X-th round special mutual capacitive detecting step, including: having the driving circuit sending the driving signal to neighboring $M_x$ first electrodes, where $M_x$ is a positive integer smaller than N, the neighboring $M_x$ first electrodes do not include the first electrodes having been sent the driving signal in the multiple sets of X-th round mutual capacitive detecting steps; and having the sensing circuit simultaneously detecting the driving signal via the second electrodes for generating multiple X-th round special sensing information with respective to the set of X-th round special mutual capacitive detecting step, wherein each of the X-th round special sensing information is corresponding to an intersection of central line of the $M_x$ first electrodes and the second electrode, wherein the touch sensitive processing method directs to and adjusts one of or any combination of parameters to make detecting strengths of the second electrode with respective to the $M_x$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating more precise approximating or touching position of the approaching object in multiple round detecting, the touch sensitive processing method further includes: executing iteratively the following steps for N times to get N p-th round position of the at least one approaching object on the touch screen: calculating at least one p-th round position of the at least one object approaching or touching the touch screen according to the multiple p-th round sensing information and the multiple p-th round special sensing information; averaging N p-th round positions to get an average position; and reporting the average position to a host.

In one embodiment, in response to the touch panel being not grouped into N neighboring first electrodes and ungrouped first electrodes are further not adjacent to each other, the neighboring $M_p$ first electrodes and the neighboring $M_q$ first electrodes include different first electrodes, where p and q are different positive integers ranging from 1 to N.

In one embodiment, in response to the touch panel being not grouped into N neighboring first electrodes, the value of $M_p$ is the same as the value of $M_q$, where p and q are different positive integers ranging from 1 to N.

In one embodiment, for reducing EMI with other adjacent parts or electronic apparatuses, the neighboring $M_p$ first electrodes are selected in random, where p is a positive integer from 1 to N.

In one embodiment, for simplifying algorithm, the neighboring $M_1$ first electrodes are the $M_1$ first electrodes near one edge of the touch screen, the neighboring $M_N$ first electrodes are the $M_N$ first electrodes near the other edge of the touch screen.

In one embodiment, for averaging EMI resulting from pixel refreshing to the sensing circuit or letting EMI of the driving signal being evenly distributed over the pixel horizontal axis, the first electrodes are parallel to the pixel horizontal axis of the touch screen. In one embodiment, for reducing the thickness of the touch screen, the touch screen is an in-cell touch LCD screen, a common electrode of the touch screen includes at least one first electrode.

In one embodiment, for speeding up the rate of reporting approaching object, the touch sensitive processing method further includes: executing a whole-screen-driving detecting step before executing the multiple sets of first round mutual capacitive detecting steps; and executing the multiple sets of first round mutual capacitive detecting steps when the at least one approaching object is detected by the whole-screen-driving detecting step. In the embodiment, the touch sensitive processing method further includes: executing a sequential driving detecting step before executing the multiple sets of first round mutual capacitive detecting steps; and executing the multiple sets of first round mutual capacitive detecting steps when the number of the approaching object detected by the sequential driving detecting step is bigger than a threshold. In the embodiment, the whole-screen-driving detecting step further includes: having the driving circuit simultaneously sending the driving signal to all the first electrodes; having the sensing circuit simultaneously detecting the driving signal via the second electrodes for generating one-dimensional sensing information with respective to and formed by multiple sensing information; and determining if at least one approaching object approximates the touch screen according to the one-dimensional sensing information. In the embodiment, the sequential driving detecting step further includes: having the driving circuit alternatively sending the driving signal to all the first electrodes in time division; having the sensing circuit simultaneously detecting the driving signal via the second electrodes when each of the first electrodes sends the driving signal for generating two-dimensional sensing information with respective to and formed by multiple sensing information; and determining a number of and a position of the approaching object approximating or touching the touch screen according to the two-dimensional sensing information.

According to one embodiment of the present invention, for speeding up the reporting rate of approximating or touching event to let user keep the same or even have better experience in using the touch screen in big size, it provides a touch panel, including: multiple first electrodes being parallel to a first axis; multiple second electrodes being parallel to a second axis; and multiple third electrodes being parallel to the second axis, wherein each of the first electrodes is arranged to be spanned on the touch panel and intersects with the second electrodes or the third electrodes to form a plurality of intersection areas.

In one embodiment, for simplifying algorithm and/or manufacturing cost, intervals between each two of the first electrodes are equivalent.

In one embodiment, for simplifying algorithm and/or manufacturing cost, a number of the second electrodes equals to a number of the third electrodes. In the embodiment, an axial direction of each of the second electrodes is the same as that of one of the third electrodes.

In one embodiment, for adapting to different accuracy in different areas, a number of the second electrodes does not equal to a number of the third electrodes. In the embodiment, an axial direction of each of the second electrodes is not the same as that of the third electrodes.

In one embodiment, for connecting to a touch sensitive processing apparatus, the second electrodes connect to a touch sensitive processing apparatus via a first side of the touch panel, the third electrodes connect to the touch sensitive processing apparatus via a second side of the touch panel, wherein the first side is parallel to the second side.

In one embodiment, for forming a touch screen, the touch panel is disposed on a screen. In the embodiment, for averaging EMI resulting from pixel refreshing to the sensing circuit or letting EMI of the driving signal being evenly distributed over the pixel horizontal axis, the first axis is parallel to an axial direction of pixel-refreshing of the screen.

In one embodiment, for reducing the thickness of the touch screen, the touch panel is a part of an in-cell touch LCD screen, the first electrodes are the common electrodes of the in-cell touch LCD screen.

According to one embodiment of the present invention, for speeding up the reporting rate of approximating or touching event to let user keep the same or even have better experience in using the touch screen in big size, it provides an electronic system, including: a touch panel; and a touch sensitive processing apparatus connecting to the touch panel. The touch panel includes: multiple first electrodes being parallel to a first axis; multiple second electrodes being parallel to a second axis; and multiple third electrodes being parallel to the second axis, wherein each of the first electrodes is arranged to be spanned on the touch panel and intersects with the second electrodes or the third electrodes to form multiple intersection areas. The second electrodes connect to the touch sensitive processing apparatus via a first side of the touch panel, the third electrodes connect to the touch sensitive processing apparatus via a second side of the touch panel, wherein the first side is parallel to the second side.

According to one embodiment of the present invention, for speeding up the reporting rate of approximating or touching event to let user keep the same or even have better experience in using the touch screen in big size, it provides a touch screen, including: multiple first electrodes being parallel to a first axis; multiple second electrodes being parallel to a second axis; and multiple third electrodes being parallel to the second axis, wherein each of the first electrodes is arranged to be spanned on the touch screen and intersects with the second electrodes or the third electrodes to form a plurality of intersection areas.

In one embodiment, for simplifying algorithm and/or manufacturing cost, intervals between each two of the first electrodes are equivalent.

In one embodiment, for simplifying algorithm and/or manufacturing cost, a number of the second electrodes equals to a number of the third electrodes. In the embodiment, an axial direction of each of the second electrodes is the same as that of one of the third electrodes.

In one embodiment, for adapting to different accuracy in different areas, a number of the second electrodes does not equal to a number of the third electrodes. In the embodiment, an axial direction of each of the second electrodes is not the same as that of the third electrodes.

In one embodiment, for connecting to a touch sensitive processing apparatus, the second electrodes connect to a touch sensitive processing apparatus via a first side of the touch screen, the third electrodes connect to the touch sensitive processing apparatus via a second side of the touch screen, wherein the first side is parallel to the second side.

In one embodiment, for averaging EMI resulting from pixel refreshing to the sensing circuit or letting EMI of the driving signal being evenly distributed over the pixel horizontal axis, the first axis is parallel to an axial direction of pixel-refreshing of the screen.

In one embodiment, for reducing the thickness of the touch screen, the touch screen is a part of an in-cell touch LCD screen, the first electrodes are the common electrodes of the in-cell touch LCD screen.

According to one embodiment of the present invention, for speeding up the reporting rate of approximating or touching event to let user keep the same or even have better experience in using the touch screen in big size, it provides an electronic system, including: a touch screen; and a touch sensitive processing apparatus connecting to the touch screen. The touch screen includes: multiple first electrodes being parallel to a first axis; multiple second electrodes being parallel to a second axis; and multiple third electrodes being parallel to the second axis, wherein each of the first electrodes is arranged to be spanned on the touch screen and intersects with the second electrodes or the third electrodes to form multiple intersection areas. The second electrodes connect to the touch sensitive processing apparatus via a first side of the touch screen, the third electrodes connect to the touch sensitive processing apparatus via a second side of the touch screen, wherein the first side is parallel to the second side.

According to one embodiment of the present invention, for speeding up the reporting rate of approximating or touching event to let user keep the same or even have better experience in using the touch screen in big size, it provides a touch sensitive processing apparatus configured to connect to a touch screen and used to detect at least one object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing apparatus includes: a driving circuit, connecting to the first electrodes, respectively; a sensing circuit, connecting to the second electrodes and the third electrodes, respectively; and a processor, configured to connect to the driving circuit and the sensing circuit. The processor is configured for iteratively executing the following steps: having the driving circuit simultaneously sending a driving signal to two or more first electrodes, wherein at least one of the two or more first electrodes intersects with the second electrodes to form the multiple intersection areas, the other of the two or more first electrodes intersects with the third electrodes to form the multiple intersection areas; and having the sensing circuit simultaneously sensing the driving signal via the second electrodes to generate a one-dimensional sensing information, having the sensing circuit simultaneously sensing the driving signal via the third electrodes to generate another one-dimensional sensing information.

In one embodiment, in response to the numbers of the first electrodes intersecting with the second electrodes different to that of the first electrodes intersecting with the third electrodes, that is, the numbers of the first electrode in the upper half and the lower half are different, the processor is further used for: executing iteratively the following steps when all of the first electrodes intersecting with the second electrodes to form multiple intersection areas have been sent the driving signal: having the driving circuit sending the driving signal to one of the electrodes having been not sent the driving signal; and having the sensing circuit simultaneously sensing the driving signal via the third electrodes to generate another one-dimensional sensing information.

In one embodiment, for calculating at least one approximating position of at least one approaching object, the processor is further used for: piecing up all of the one-dimensional sensing information with respective to the order of the first electrodes to a two-dimensional sensing information when all of the first electrodes have been sent the driving signal; and detecting at least one object approximating or touching the touch screen according to the two-dimensional sensing information.

In one embodiment, for simplifying algorithm, the two or more first electrodes used for sending the driving signal in iteratively executing steps are selected in order according to the positions on the touch screen.

In one embodiment, for avoiding fixed frequency's EMI with other adjacent parts or electronic apparatuses, the two or more first electrodes used for sending the driving signal in iteratively executing steps are selected in random.

In one embodiment, for speeding up the reporting rate of approximating event, a whole screen driving detecting is first performed. The processor is further used for: executing the following steps before executing the iterative steps: having the driving circuit sending the driving signal to all of the first electrodes; having the sensing circuit simultaneously sensing the driving signal via the second electrodes to generate a one-dimensional first half screen sensing information, having the sensing circuit simultaneously sensing the driving signal via the third electrodes to generate a one-dimensional second half screen sensing information; determining if at least one object approximating or touching at least one of the second electrodes according to the one-dimensional first half screen sensing information; determining if at least one object approximating or touching at least one of the third electrodes according to the one-dimensional second half screen sensing information; and executing the iterative steps when the at least one object approximating or touching at least one of the second electrodes and at least one of the third electrodes is determined.

In one embodiment, for simplifying algorithm and/or manufacturing cost, intervals between each two of the first electrodes are equivalent.

In one embodiment, for simplifying algorithm and/or manufacturing cost, a number of the second electrodes equals to a number of the third electrodes. In the embodiment, an axial direction of each of the second electrodes is the same as that of one of the third electrodes.

In one embodiment, for averaging EMI resulting from pixel refreshing to the sensing circuit or letting EMI of the driving signal being evenly distributed over the pixel horizontal axis, the first axis is parallel to an axial direction of pixel-refreshing of the screen.

In one embodiment, for connecting to a touch sensitive processing apparatus, the second electrodes connect to a touch sensitive processing apparatus via a first side of the touch screen, the third electrodes connect to the touch sensitive processing apparatus via a second side of the touch screen, wherein the first side is parallel to the second side.

In one embodiment, for reducing the thickness of the touch screen, the touch screen is an in-cell touch LCD screen, the first electrodes are the common electrodes of the in-cell touch LCD screen.

According to one embodiment of the present invention, for speeding up the reporting rate of approximating or touching event to let user keep the same or even have better experience in using the touch screen in big size, it provides a touch sensitive processing method adaptive to a touch sensitive processing apparatus configured to connect to a touch screen and used to detect at least one object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing method includes: executing iteratively the following steps: having the driving circuit simultaneously sending a driving signal to two or more first electrodes, wherein at least one of the two or more first electrodes intersects with the second electrodes to form the multiple intersection areas, the other of the two or more first electrodes intersects with the third electrodes to form the multiple intersection areas; and having a sensing circuit simultaneously sensing the driving signal via the second electrodes to generate a one-dimensional sensing information, having the sensing circuit simultaneously sensing the driving signal via the third electrodes to generate another one-dimensional sensing information.

In one embodiment, in response to the numbers of the first electrodes intersecting with the second electrodes different to that of the first electrodes intersecting with the third electrodes, that is, the numbers of the first electrode in the upper half and the lower half are different, the touch sensitive processing method further includes: executing iteratively the following steps when all of the first electrodes intersecting with the second electrodes to form multiple intersection areas have been sent the driving signal: having the driving circuit sending the driving signal to one of the electrodes having been not sent the driving signal; and having the sensing circuit simultaneously sensing the driving signal via the third electrodes to generate another one-dimensional sensing information.

In one embodiment, for calculating at least one position of at least one object, the touch sensitive processing method further includes: piecing up all of the one-dimensional sensing information with respective to the order of the first electrodes to a two-dimensional sensing information when all of the first electrodes have been sent the driving signal; and detecting at least one object approximating or touching the touch screen according to the two-dimensional sensing information.

In one embodiment, for simplifying algorithm, the two or more first electrodes used for sending the driving signal in iteratively executing steps are selected in order according to the positions on the touch screen.

In one embodiment, for avoiding fixed frequency's EMI with other adjacent parts or electronic apparatuses, the two or more first electrodes used for sending the driving signal in iteratively executing steps are selected in random.

In one embodiment, for speeding up the reporting rate of approximating event, a whole screen driving detecting is first performed. The touch sensitive processing method further includes: executing the following steps before executing the iterative steps: having the driving circuit sending the driving signal to all of the first electrodes; having the sensing circuit simultaneously sensing the driving signal via the second electrodes to generate a one-dimensional first half screen sensing information, having the sensing circuit simultaneously sensing the driving signal via the third electrodes to generate a one-dimensional second half screen sensing information; determining if at least one approaching object approximates or touches at least one of the second electrodes according to the one-dimensional first half screen sensing information; determining if at least one object approximatings or touching at least one of the third electrodes according to the one-dimensional second half screen sensing information; and executing the iterative steps when the at least one object approximating or touching at least one of the second electrodes and at least one of the third electrodes is determined.

In one embodiment, for simplifying algorithm and/or manufacturing cost, intervals between each two of the first electrodes are equivalent.

In one embodiment, for simplifying algorithm and/or manufacturing cost, a number of the second electrodes equals to a number of the third electrodes. In the embodiment, an axial direction of each of the second electrodes is the same as that of one of the third electrodes.

In one embodiment, for averaging EMI resulting from pixel refreshing to the sensing circuit or letting EMI of the driving signal being evenly distributed over the pixel horizontal axis, the first axis is parallel to an axial direction of pixel-refreshing of the screen.

In one embodiment, for connecting to a touch sensitive processing apparatus, the second electrodes connect to a touch sensitive processing apparatus via a first side of the touch screen, the third electrodes connect to the touch sensitive processing apparatus via a second side of the touch screen, wherein the first side is parallel to the second side.

In one embodiment, for reducing the thickness of the touch screen, the touch screen is an in-cell touch LCD screen, the first electrodes are the common electrodes of the in-cell touch LCD screen.

According to one embodiment of the present invention, for speeding up the reporting rate of approximating or touching event to let user keep the same or even have better experience in using the touch screen in big size, it provides an electronic system. The electronic system includes a touch screen and a touch sensitive processing apparatus connecting to the touch screen. The features of the touch screen and the touch sensitive processing apparatus connecting to the touch screen are described as above.

According to one embodiment of the present invention, for speeding up the reporting rate of approximating or touching event to let user keep the same or even have better experience in using the touch screen in big size, it provides a touch sensitive processing apparatus configured to connect to a touch screen and used to detect at least one approaching object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing apparatus includes: a driving circuit, connecting to the first electrodes, respectively; a sensing circuit, connecting to the second electrodes and the third electrodes, respectively; and a processor, configured to connect to the driving circuit and the sensing circuit. The processor is configured for iteratively executing the following steps: having the driving circuit sending the driving signal to all of the first electrodes; having the sensing circuit simultaneously sensing the driving signal via the second electrodes to generate a one-dimensional first half screen sensing information, having the sensing circuit simultaneously sensing the driving signal via the third electrodes to generate a one-dimensional second half screen sensing information; determining if any object approximating or touching at least one of the second electrodes according to the one-dimensional first half screen sensing information; determining if any object approximating or touching at least one of the third electrodes according to the one-dimensional second half screen sensing information; and reporting to a host there is no object when no object approximating or touching at least one of the second electrodes and at least one of the third electrodes is determined.

According to one embodiment of the present invention, for speeding up the reporting rate of approximating or touching event to let user keep the same or even have better experience in using the touch screen in big size, it provides a touch sensitive processing method adaptive to a touch sensitive processing apparatus configured to connect to a touch screen and used to detect at least one approaching object approximating or touching the touch screen. Wherein the touch screen includes multiple first electrodes being parallel to a first axis, multiple second electrodes being parallel to a second axis, and multiple third electrodes being parallel to the second axis. Wherein each of the first electrodes is arranged to be spanned on the touch screen and intersects with the second electrodes or the third electrodes to form multiple intersection areas. The touch sensitive processing method includes: having a driving circuit sending a driving signal to all of the first electrodes; having a sensing circuit simultaneously sensing the driving signal via the second electrodes to generate a one-dimensional first half screen sensing information, having the sensing circuit simultaneously sensing the driving signal via the third electrodes to generate a one-dimensional second half screen sensing information; determining if any object approximating or touching at least one of the second electrodes according to the one-dimensional first half screen sensing information; determining if any object approximating or touching at least one of the third electrodes according to the one-dimensional second half screen sensing information; and reporting to a host there is no object when no object approximating or touching at least one of the second electrodes and at least one of the third electrodes is determined.

According to one embodiment of the present invention, for speeding up the reporting rate of approximating or touching event to let user keep the same or even have better experience in using the touch screen in big size, it provides a touch sensitive electronic system. The touch sensitive electronic system includes a touch screen and a touch sensitive processing apparatus connecting to the touch screen. The features of the touch screen and the touch sensitive processing apparatus connecting to the touch screen are described as above.

According to one embodiment of the present invention, for speeding up the reporting rate of approximating or touching event to let user keep the same or even have better experience in using the touch screen in big size, it provides a touch sensitive processing apparatus configured to connect to a touch screen and used to detect at least one approaching object approximating or touching the touch screen. Wherein the touch screen includes multiple neighboring first electrodes and multiple neighboring second electrodes parallel to a first axis, multiple neighboring third electrodes and multiple neighboring fourth electrodes parallel to a second axis. Wherein each of the first electrodes intersects with the third electrodes to form multiple intersection areas, each of the second electrodes intersects with the fourth electrodes to form multiple intersection areas. The touch sensitive processing apparatus includes: a driving circuit, connecting to the first electrodes and the second electrodes, respectively; a sensing circuit, connecting to the third electrodes and the fourth electrodes, respectively; and a processor, configured to connect to the driving circuit and the sensing circuit. The processor is configured for: executing multiple sets of first round mutual capacitive detecting steps, wherein each set of the first round mutual capacitive detecting step further includes: having the driving circuit sending a driving signal to neighboring N first electrodes and neighboring N second electrodes, where N is a positive integer larger than 1; having the sensing circuit simultaneously detecting the driving signal via the third electrodes for generating multiple first round first sensing information with respective to the set of first round mutual capacitive detecting step, wherein each of the first round first sensing information is corresponding to an intersection of central line of the N first electrodes and the third electrode; and having the sensing circuit simultaneously detecting the driving signal via the fourth electrodes for generating multiple first round second sensing information with respective to the set of first round mutual capacitive detecting step, wherein each of the first round second sensing information is corresponding to an intersection of central line of the N second electrodes and the fourth electrode.

In one embodiment, for calculating at least one position of at least one object, the processor is further used for: calculating at least one position of the at least one approaching object on the touch screen according to the multiple first round first sensing information and the multiple first round second sensing information generated from the multiple first round mutual capacitive detecting steps; and reporting the at least one position to a host.

In one embodiment, in response to the touch panel being not grouped into N neighboring first electrodes, the processor is further used for: executing at least one first round first special mutual capacitive detecting step, including: having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps; and having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of central line of the $M_1$ first electrodes and the third electrode, wherein the processor directs to and adjusts one of or any combination of parameters to make detecting strengths of the third electrode with respective to the $M_1$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, in response to the touch panel being not grouped into N neighboring first electrodes and ungrouped first electrodes are further not adjacent to each other, the processor is further used for: executing another first round first special mutual capacitive detecting step, including: having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps; and having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of central line of the $M_2$ first electrodes and the third electrode, wherein the processor directs to and adjusts one of or any combination of parameters to make detecting strengths of the third electrode with respective to the $M_2$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating at least one position of at least one object, the processor is further used for: calculating at least one first round position of the at least one object on the touch screen according to the multiple first round sensing information generated from the multiple sets of first round mutual capacitive detecting steps and the multiple first round first special sensing information generated from all of the first round first special mutual capacitive detecting steps; and reporting the at least one first round position to a host.

In one embodiment, in response to the touch panel being not grouped into neighboring second electrodes, the processor is further used for: executing at least one first round second special mutual capacitive detecting step, including: having the driving circuit sending the driving signal to neighboring $M_3$ second electrodes, where $M_3$ is a positive integer smaller than N, the neighboring $M_3$ second electrodes do not include the second electrodes having been sent the driving signal in the multiple sets of first round mutual capacitive detecting steps; and having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of central line of the $M_3$ second electrodes and the fourth electrode, wherein the processor directs to and adjusts one of or any combination of parameters to make detecting strengths of the fourth electrode with respective to the $M_3$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, in response to the touch panel being not grouped into N neighboring second electrodes and ungrouped second electrodes are further not adjacent to each other, the processor is further used for: executing another first round second special mutual capacitive detecting step, including: having the driving circuit sending the driving signal to neighboring $M_4$ second electrodes, where $M_4$ is a positive integer smaller than N and is not equal to $M_3$, the neighboring $M_4$ second electrodes do not include the second electrodes and the $M_3$ second electrodes having been sent the driving signal in the multiple sets of first round mutual capacitive detecting steps; and having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of central line of the $M_4$ second electrodes and the fourth electrode, wherein the processor directs to and adjusts one of or any combination of parameters to make detecting strengths of the fourth electrode with respective to the $M_4$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating at least one position of at least one object, the processor is further used for: calculating at least one first round position of the at least one object on the touch screen according to the multiple first round sensing information generated from the multiple sets of first round mutual capacitive detecting steps, the multiple first round first special sensing information generated from all of the first round first special mutual capacitive detecting steps, and the multiple first round second special sensing information generated from all of the first round second special mutual capacitive detecting steps; and reporting the first round position to a host.

In one embodiment, for compensating inaccuracy resulting from one round sensing information, multiple round detecting is performed to increase the accuracy of the approximating position. The processor is further used for: executing iteratively the following steps for N−1 times: executing multiple X-th round mutual capacitive detecting steps, where X is a positive integer from 2 to N, wherein each of the X-th round mutual capacitive detecting steps includes: having the driving circuit simultaneously sending the driving signal to neighboring N first electrodes and neighboring N second electrodes, where N is a positive integer larger than 1; and having the sensing circuit simultaneously detecting the driving signal via the third electrodes for generating multiple X-th round first sensing information with respective to the set of X-th round mutual capacitive detecting step, having the sensing circuit simultaneously detecting the driving signal via the fourth electrodes for generating multiple X-th round second sensing information with respective to the set of X-th round mutual capacitive detecting step, wherein each of the X-th round second sensing information is corresponding to an intersection of central line of the N second electrodes and the fourth electrode; and executing one X-th round special mutual capacitive detecting step, including: having the driving circuit sending the driving signal to neighboring $M_x$ first electrodes and neighboring $M_y$ second electrodes, where $M_x$, $M_y$ are positive integers smaller than N, the neighboring $M_x$ first electrodes do not include the first electrodes having been sent the driving signal in the multiple sets of X-th round mutual capacitive detecting steps, the neighboring $M_y$ second electrodes do not include the second electrodes having been sent the driving signal in the multiple sets of X-th round mutual capacitive detecting steps; and having the sensing circuit simultaneously detecting the driving signal via the third electrodes for generating multiple X-th round first special sensing information with respective to the set of X-th round special mutual capacitive detecting step, wherein each of the X-th round first special sensing information is corresponding to an intersection of central line of the $M_x$ first electrodes and the third electrode, having the sensing circuit simultaneously detecting the driving signal via the fourth electrodes for generating multiple X-th round second special sensing information with respective to the set of X-th round special mutual capacitive detecting step, wherein each of the X-th round second special sensing information is corresponding to an intersection of central line of the $M_y$ second electrodes and the fourth electrode, wherein the processor directs to and adjusts one of or any combination of parameters to make detecting strengths of the third electrode with respective to the $M_x$ first electrodes and the N first electrodes are equivalent, and to make detecting strengths of the fourth electrode with respective to the $M_y$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating more precise approximating or touching position of the object in multiple round detecting, the processor is further used for: executing iteratively the following steps for N times to get N p-th round position of the at least one approaching object on the touch screen: calculating at least one p-th round position of the at least one approaching object on the touch screen according to the multiple p-th round sensing information generated from the multiple set of p-th round mutual capacitive detecting steps, the multiple p-th round first special sensing information, and the multiple p-th round second special sensing information; averaging N p-th round position to get an average position, where p is a positive integer from 1 to N; and reporting the average position to a host.

In one embodiment, in response to the touch screen being not grouped into N neighboring first electrodes and ungrouped first electrodes are further not adjacent to each other, the neighboring $M_p$ first electrodes and the neighboring $M_q$ first electrodes include different first electrodes, where p and q are different positive integers ranging from 1 to N.

In one embodiment, in response to the touch screen being not grouped into N neighboring first electrodes, the value of $M_p$ is the same as the value of $M_q$, where p and q are different positive integers ranging from 1 to N.

In one embodiment, for reducing EMI with other adjacent parts or electronic apparatuses, the neighboring $M_p$ first electrodes are selected in random, where p is a positive integer from 1 to N.

In one embodiment, for simplifying algorithm, the neighboring $M_1$ first electrodes are the $M_1$ first electrodes near one edge of the touch screen, the neighboring $M_N$ first electrodes are the $M_N$ first electrodes near the other edge of the touch screen.

In one embodiment, for averaging EMI resulting from pixel refreshing to the sensing circuit or letting EMI of the driving signal being evenly distributed over the pixel horizontal axis, the first electrodes and the second electrodes are parallel to the pixel horizontal axis of the touch screen. In one embodiment, for reducing the thickness of the touch screen, the touch screen is an in-cell touch LCD screen, a common electrode of the touch screen includes at least one first electrode and at least one second electrode.

In one embodiment, for speeding up the reporting rate of approximating or touching event to let user keep the same or even have better experience in using the touch screen in big size, the processor is further used for: having the driving circuit sending the driving signal to all of the first electrodes and the second electrodes before executing the multiple first round mutual capacitive detecting steps; having the sensing circuit simultaneously sensing the driving signal via the third electrodes to generate a one-dimensional first half screen sensing information, having the sensing circuit simultaneously sensing the driving signal via the fourth electrodes to generate a one-dimensional second half screen sensing information; determining if at least one object approximating or touching at least one of the third electrodes according to the one-dimensional first half screen sensing information; determining if at least one object approximating or touching at least one of the fourth electrodes according to the one-dimensional second half screen sensing information; and executing the multiple first round mutual capacitive detecting steps when the at least one object approximating or touching at least one of the third electrodes and at least one of the fourth electrodes is determined.

According to one embodiment of the present invention, for speeding up the reporting rate of approximating or touching event to let user keep the same or even have better experience in using the touch screen in big size, it provides a touch sensitive processing method adaptive to a touch sensitive processing apparatus configured to connect to a touch screen and used to detect at least one object approximating or touching the touch screen. Wherein the touch screen includes multiple neighboring first electrodes and multiple neighboring second electrodes parallel to a first axis, multiple neighboring third electrodes and multiple neighboring fourth electrodes parallel to a second axis. Each of the first electrodes intersects with the third electrodes to form the multiple intersection areas, each of the second electrodes intersects with the fourth electrodes to the form multiple intersection areas. The touch sensitive processing method includes: executing multiple sets of first round mutual capacitive detecting steps, wherein each set of the first round mutual capacitive detecting step further includes: having a driving circuit sending a driving signal to neighboring N first electrodes and neighboring N second electrodes, where N is a positive integer larger than 1; having a sensing circuit simultaneously detecting the driving signal via the third electrodes for generating multiple first round first sensing information with respective to the set of first round mutual capacitive detecting step, wherein each of the first round first sensing information is corresponding to an intersection of central line of the N first electrodes and the third electrode; and having the sensing circuit simultaneously detecting the driving signal via the fourth electrodes for generating multiple first round second sensing information with respective to the set of first round mutual capacitive detecting step, wherein each of the first round second sensing information is corresponding to an intersection of central line of the N second electrodes and the fourth electrode.

In one embodiment, for calculating at least one position of at least one object, the touch sensitive processing method further includes: calculating at least one position of the at least one object on the touch screen according to the multiple first round first sensing information and the multiple first round second sensing information generated from the multiple first round mutual capacitive detecting steps; and reporting the at least one position to a host.

In one embodiment, in response to the touch panel being not grouped into N neighboring first electrodes, the touch sensitive processing method further includes: executing at least one first round first special mutual capacitive detecting step, including: having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps; and having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of central line of the $M_1$ first electrodes and the third electrode, wherein the touch sensitive processing method directs to and adjusts one of or any combination of parameters to make detecting strengths of the third electrode with respective to the $M_1$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, in response to the touch panel being not grouped into N neighboring first electrodes and ungrouped first electrodes are further not adjacent to each other, the touch sensitive processing method further includes: executing another first round first special mutual capacitive detecting step, including: having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps; and having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of central line of the $M_2$ first electrodes and the third electrode, wherein the touch sensitive processing method directs to and adjusts one of or any combination of parameters to make detecting strengths of the third electrode with respective to the $M_2$ first electrodes and the N first electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating at least one position of at least one object, the touch sensitive processing method further includes: calculating at least one first round position of the at least one approaching object on the touch screen according to the multiple first round sensing information generated from the multiple sets of first round mutual capacitive detecting steps and the multiple first round first special sensing information generated from all of the first round first special mutual capacitive detecting steps; and reporting the at least one first round position to a host.

In one embodiment, in response to the touch panel being not grouped into neighboring second electrodes, the touch sensitive processing method further includes: executing at least one first round second special mutual capacitive detecting step, including: having the driving circuit sending the driving signal to neighboring $M_3$ second electrodes, where $M_3$ is a positive integer smaller than N, the neighboring $M_3$ second electrodes do not include the second electrodes having been sent the driving signal in the multiple sets of first round mutual capacitive detecting steps; and having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of central line of the $M_3$ second electrodes and the fourth electrode, wherein the touch sensitive processing method directs to and adjusts one of or any combination of parameters to make detecting strengths of the fourth electrode with respective to the $M_3$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, in response to the touch panel being not grouped into N neighboring second electrodes and ungrouped second electrodes are further not adjacent to each other, the touch sensitive processing method further includes: executing another first round second special mutual capacitive detecting step, including: having the driving circuit sending the driving signal to neighboring $M_4$ second electrodes, where $M_4$ is a positive integer smaller than N and is not equal to $M_3$, the neighboring $M_4$ second electrodes do not include the second electrodes and the $M_3$ second electrodes having been sent the driving signal in the multiple sets of first round mutual capacitive detecting steps; and having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of central line of the $M_4$ second electrodes and the fourth electrode, wherein the touch sensitive processing method directs to and adjusts one of or any combination of parameters to make detecting strengths of the fourth electrode with respective to the $M_4$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating at least one position of at least one object, the touch sensitive processing method further includes: calculating at least one first round position of the at least one object on the touch screen according to the multiple first round sensing information generated from the multiple sets of first round mutual capacitive detecting steps, the multiple first round first special sensing information generated from all of the first round first special mutual capacitive detecting steps, and the multiple first round second special sensing information generated from all of the first round second special mutual capacitive detecting steps; and reporting the first round position to a host.

In one embodiment, for compensating inaccuracy resulting from one round sensing information, multiple round detecting is performed to increase the accuracy of the approximating position. The touch sensitive processing method further includes: executing iteratively the following steps for N−1 times: executing multiple X-th round mutual capacitive detecting steps, where X is a positive integer from 2 to N, wherein each of the X-th round mutual capacitive detecting steps includes: having the driving circuit simultaneously sending the driving signal to neighboring N first electrodes and neighboring N second electrodes, where N is a positive integer larger than 1; and having the sensing circuit simultaneously detecting the driving signal via the third electrodes for generating multiple X-th round first sensing information with respective to the set of X-th round mutual capacitive detecting step, having the sensing circuit simultaneously detecting the driving signal via the fourth electrodes for generating multiple X-th round second sensing information with respective to the set of X-th round mutual capacitive detecting step, wherein each of the X-th round second sensing information is corresponding to an intersection of central line of the N second electrodes and the fourth electrode; and executing one X-th round special mutual capacitive detecting step, including: having the driving circuit sending the driving signal to neighboring $M_x$ first electrodes and neighboring $M_y$ second electrodes, where $M_x$, $M_y$ are positive integers smaller than N, the neighboring $M_x$ first electrodes do not include the first electrodes having been sent the driving signal in the multiple sets of X-th round mutual capacitive detecting steps, the neighboring $M_y$ second electrodes do not include the second electrodes having been sent the driving signal in the multiple sets of X-th round mutual capacitive detecting steps; and having the sensing circuit simultaneously detecting the driving signal via the third electrodes for generating multiple X-th round first special sensing information with respective to the set of X-th round special mutual capacitive detecting step, wherein each of the X-th round first special sensing information is corresponding to an intersection of central line of the $M_x$ first electrodes and the third electrode, having the sensing circuit simultaneously detecting the driving signal via the fourth electrodes for generating multiple X-th round second special sensing information with respective to the set of X-th round special mutual capacitive detecting step, wherein each of the X-th round second special sensing information is corresponding to an intersection of central line of the $M_y$ second electrodes and the fourth electrode, wherein the touch sensitive processing method directs to and adjusts one of or any combination of parameters to make detecting strengths of the third electrode with respective to the $M_x$ first electrodes and the N first electrodes are equivalent, and to make detecting strengths of the fourth electrode with respective to the $M_y$ second electrodes and the N second electrodes are equivalent, wherein the parameters includes: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

In one embodiment, for calculating more precise position of the object in multiple round detecting, the touch sensitive processing method further includes: executing iteratively the following steps for N times to get N p-th round position of the at least one approaching object on the touch screen: calculating at least one p-th round position of the at least one object on the touch screen according to the multiple p-th round sensing information generated from the multiple set of p-th round mutual capacitive detecting steps, the multiple p-th round first special sensing information, and the multiple p-th round second special sensing information; averaging N p-th round position to get an average position, where p is a positive integer from 1 to N; and reporting the average position to a host.

In one embodiment, in response to the touch screen being not grouped into N neighboring first electrodes and ungrouped first electrodes are further not adjacent to each other, the neighboring $M_p$ first electrodes and the neighboring $M_q$ first electrodes include different first electrodes, where p and q are different positive integers ranging from 1 to N.

In one embodiment, in response to the touch screen being not grouped into N neighboring first electrodes, the value of $M_p$ is the same as the value of $M_q$, where p and q are different positive integers ranging from 1 to N.

In one embodiment, for reducing EMI with other adjacent parts or electronic apparatuses, the neighboring $M_p$ first electrodes are selected in random, where p is a positive integer from 1 to N.

In one embodiment, for simplifying algorithm, the neighboring $M_1$ first electrodes are the $M_1$ first electrodes near one edge of the touch screen, the neighboring $M_N$ first electrodes are the $M_N$ first electrodes near the other edge of the touch screen.

In one embodiment, for averaging EMI resulting from pixel refreshing to the sensing circuit or letting EMI of the driving signal being evenly distributed over the pixel horizontal axis, the first electrodes and the second electrodes are parallel to the pixel horizontal axis of the touch screen. In one embodiment, for reducing the thickness of the touch screen, the touch screen is an in-cell touch LCD screen, a common electrode of the touch screen includes at least one first electrode and at least one second electrode.

In one embodiment, for speeding up the reporting rate of approximating or touching event to let user keep the same or even have better experience in using the touch screen in big size, the touch sensitive processing method further includes: having the driving circuit sending the driving signal to all of the first electrodes and the second electrodes before executing the multiple sets of first round mutual capacitive detecting steps: having the sensing circuit simultaneously sensing the driving signal via the third electrodes to generate a one-dimensional first half screen sensing information, having the sensing circuit simultaneously sensing the driving signal via the fourth electrodes to generate a one-dimensional second half screen sensing information; determining if at least one object approximating or touching at least one of the third electrodes according to the one-dimensional first half screen sensing information; determining if at least one object approximating or touching at least one of the fourth electrodes according to the one-dimensional second half screen sensing information; and executing the multiple first round mutual capacitive detecting steps when the at least one object approximating or touching at least one of the third electrodes and at least one of the fourth electrodes is determined.

According to one embodiment of the present invention, for speeding up the reporting rate of approximating or touching event to let user keep the same or even have better experience in using the touch screen in big size, it provides an electronic system. The electronic system includes a touch screen and a touch sensitive processing apparatus connecting to the touch screen. The features of the touch screen and the touch sensitive processing apparatus connecting to the touch screen are described as above.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing apparatus configured to connect to a touch screen and used to detect at least one object approximating or touching the touch screen, wherein the touch screen comprises a plurality of neighboring first electrodes and a plurality of neighboring second electrodes parallel to a first axis, a plurality of neighboring third electrodes and a plurality of neighboring fourth electrodes parallel to a second axis, wherein each of the first electrodes intersects with the third electrodes to form multiple intersection areas, each of the second electrodes intersects with the fourth electrodes to form multiple intersection areas, the touch sensitive processing apparatus comprising:
　　a driving circuit, connecting to the first electrodes and the second electrodes, respectively;
　　a sensing circuit, connecting to the third electrodes and the fourth electrodes, respectively; and
　　a processor, configured to connect to the driving circuit and the sensing circuit, the processor configured for:
　　　　executing multiple sets of first round mutual capacitive detecting steps, wherein each set of the first round mutual capacitive detecting step further comprises:
　　　　　　having the driving circuit sending a driving signal to neighboring N first electrodes and neighboring N second electrodes, where N is a positive integer larger than 1;
　　　　　　having the sensing circuit simultaneously detecting the driving signal via the third electrodes for generating multiple first round first sensing information with respective to the set of first round mutual capacitive detecting step, wherein each of the first round first sensing information is corresponding to an intersection of a figurative central line of the N first electrodes and one of the plurality of third electrodes; and
　　　　　　having the sensing circuit simultaneously detecting the driving signal via the fourth electrodes for generating multiple first round second sensing information with respective to the set of first round mutual capacitive detecting step, wherein each of the first round second sensing information is corresponding to an intersection of a figurative central line of the N second electrodes and one of the plurality of fourth electrodes.

2. The touch sensitive processing apparatus of claim 1, wherein the processor is further used for:
　　calculating at least one position of the at least one object on the touch screen according to the multiple first round first sensing information and the multiple first round second sensing information generated from the multiple first round mutual capacitive detecting steps; and
　　reporting the at least one position to a host.

3. The touch sensitive processing apparatus of claim 1, wherein the processor is further used for:

executing at least one first round first special mutual capacitive detecting step, comprising:
  having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps; and
  having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of a figurative central line of the $M_1$ first electrodes and one of the plurality of third electrodes,
  wherein the processor directs to and adjusts one of or any combination of parameters to make detecting strengths of the third electrode with respective to the $M_1$ first electrodes and the N first electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

4. The touch sensitive processing apparatus of claim 3, wherein the processor is further used for:
executing another first round first special mutual capacitive detecting step, comprising:
  having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps; and
  having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of a figurative central line of the $M_2$ first electrodes and one of the plurality of third electrodes,
  wherein the processor directs to and adjusts one of or any combination of parameters to make detecting strengths of the third electrode with respective to the $M_2$ first electrodes and the N first electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

5. The touch sensitive processing apparatus of claim 3, wherein the processor is further used for:
calculating at least one first round position of the at least one object on the touch screen according to the multiple first round sensing information generated from the multiple sets of first round mutual capacitive detecting steps and the multiple first round first special sensing information generated from all of the first round first special mutual capacitive detecting steps; and
reporting the at least one first round position to a host.

6. The touch sensitive processing apparatus of claim 3, wherein the processor is further used for:
executing at least one first round second special mutual capacitive detecting step, comprising:
  having the driving circuit sending the driving signal to neighboring $M_3$ second electrodes, where $M_3$ is a positive integer smaller than N, the neighboring $M_3$ second electrodes do not include the second electrodes having been sent the driving signal in the multiple sets of first round mutual capacitive detecting steps; and
  having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of a figurative central line of the $M_3$ second electrodes and one of the plurality of fourth electrodes,
  wherein the processor directs to and adjusts one of or any combination of parameters to make detecting strengths of the fourth electrode with respective to the $M_3$ second electrodes and the N second electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

7. The touch sensitive processing apparatus of claim 6, wherein the processor is further used for:
executing another first round second special mutual capacitive detecting step, comprising:
  having the driving circuit sending the driving signal to neighboring $M_4$ second electrodes, where $M_4$ is a positive integer smaller than N and is not equal to $M_3$, the neighboring $M_4$ second electrodes do not include the second electrodes and the $M_3$ second electrodes having been sent the driving signal in the multiple sets of first round mutual capacitive detecting steps; and
  having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of a figurative central line of the $M_4$ second electrodes and one of the plurality of fourth electrodes,
  wherein the processor directs to and adjusts one of or any combination of parameters to make detecting strengths of the fourth electrode with respective to the $M_4$ second electrodes and the N second electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

8. The touch sensitive processing apparatus of claim 7, wherein the processor is further used for:
calculating at least one first round position of the at least one object on the touch screen according to the multiple first round sensing information generated from the multiple sets of first round mutual capacitive detecting steps, the multiple first round first special sensing information generated from all of the first round first special mutual capacitive detecting steps, and the multiple first round second special sensing information generated from all of the first round second special mutual capacitive detecting steps; and
reporting the first round position to a host.

9. The touch sensitive processing apparatus of claim 1, wherein the processor is further used for:
executing iteratively the following steps for N−1 times:
executing multiple X-th round mutual capacitive detecting steps, where X is a positive integer from 2 to N, wherein each of the X-th round mutual capacitive detecting steps comprises:
having the driving circuit simultaneously sending the driving signal to neighboring N first electrodes and neighboring N second electrodes, where N is a positive integer larger than 1; and
having the sensing circuit simultaneously detecting the driving signal via the third electrodes for generating multiple X-th round first sensing information with respective to the set of X-th round mutual capacitive detecting step, having the sensing circuit simultaneously detecting the driving signal via the fourth electrodes for generating multiple X-th round second sensing information with respective to the set of X-th round mutual capacitive detecting step, wherein each of the X-th round second sensing information is corresponding to an intersection of a figurative central line of the N second electrodes and one of the plurality of fourth electrodes; and
executing one X-th round special mutual capacitive detecting step, comprising:
having the driving circuit sending the driving signal to neighboring $M_x$ first electrodes and neighboring $M_y$ second electrodes, where $M_x$, $M_y$ are positive integers smaller than N, the neighboring $M_x$ first electrodes do not include the first electrodes having been sent the driving signal in the multiple sets of X-th round mutual capacitive detecting steps, the neighboring $M_y$ second electrodes do not include the second electrodes having been sent the driving signal in the multiple sets of X-th round mutual capacitive detecting steps; and
having the sensing circuit simultaneously detecting the driving signal via the third electrodes for generating multiple X-th round first special sensing information with respective to the set of X-th round special mutual capacitive detecting step, wherein each of the X-th round first special sensing information is corresponding to an intersection of a figurative central line of the $M_x$ first electrodes and one of the plurality of third electrodes, having the sensing circuit simultaneously detecting the driving signal via the fourth electrodes for generating multiple X-th round second special sensing information with respective to the set of X-th round special mutual capacitive detecting step, wherein each of the X-th round second special sensing information is corresponding to an intersection of a figurative central line of the $M_y$ second electrodes and one of the plurality of fourth electrodes,
wherein the processor directs to and adjusts one of or any combination of parameters to make detecting strengths of the third electrode with respective to the $M_x$ first electrodes and the N first electrodes are equivalent, and to make detecting strengths of the fourth electrode with respective to the $M_y$ second electrodes and the N second electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

10. The touch sensitive processing apparatus of claim 9, wherein the processor is further used for:
executing iteratively the following steps for N times to get N p-th round position of the at least one object on the touch screen:
calculating at least one p-th round position of the at least one object on the touch screen according to the multiple p-th round sensing information generated from the multiple set of p-th round mutual capacitive detecting steps, the multiple p-th round first special sensing information, and the multiple p-th round second special sensing information;
averaging N p-th round position to get an average position, where p is a positive integer from 1 to N; and
reporting the average position to a host.

11. The touch sensitive processing apparatus of claim 4, wherein the neighboring $M_p$ first electrodes and the neighboring $M_q$ first electrodes comprise different first electrodes, where p and q are different positive integers ranging from 1 to N.

12. The touch sensitive processing apparatus of claim 4, wherein the value of $M_p$ is the same as the value of $M_q$, where p and q are different positive integers ranging from 1 to N.

13. The touch sensitive processing apparatus of claim 3, wherein the neighboring $M_p$ first electrodes are selected in random, where p is a positive integer from 1 to N.

14. The touch sensitive processing apparatus of claim 3, wherein the neighboring $M_1$ first electrodes are the $M_1$ first electrodes near one edge of the touch screen, the neighboring $M_N$ first electrodes are the $M_N$ first electrodes near the other edge of the touch screen.

15. The touch sensitive processing apparatus of claim 1, wherein the first electrodes and the second electrodes are parallel to the pixel axis of the touch screen.

16. The touch sensitive processing apparatus of claim 1, wherein the touch screen is an in-cell touch LCD screen, a common electrode of the touch screen comprises at least one first electrode and at least one second electrode.

17. The touch sensitive processing apparatus of claim 1, wherein the processor is further configured for:
having the driving circuit sending the driving signal to all of the first electrodes and the second electrodes before executing the multiple first round mutual capacitive detecting steps;
having the sensing circuit simultaneously sensing the driving signal via the third electrodes to generate a one-dimensional first half screen sensing information, having the sensing circuit simultaneously sensing the driving signal via the fourth electrodes to generate a one-dimensional second half screen sensing information;

determining if at least one object approximating or touching at least one of the third electrodes according to the one-dimensional first half screen sensing information;

determining if at least one object approximating or touching at least one of the fourth electrodes according to the one-dimensional second half screen sensing information; and executing the multiple first round mutual capacitive detecting steps when the at least one object approximating or touching at least one of the third electrodes and at least one of the fourth electrodes is determined.

18. A touch sensitive processing method adaptive to a touch sensitive processing apparatus configured to connect to a touch screen and used to detect at least one object approximating or touching the touch screen, wherein the touch screen comprises a plurality of neighboring first electrodes and a plurality of neighboring second electrodes parallel to a first axis, a plurality of neighboring third electrodes and a plurality of neighboring fourth electrodes parallel to a second axis, wherein each of the first electrodes intersects with the third electrodes to form the multiple intersection areas, each of the second electrodes intersects with the fourth electrodes to the form multiple intersection areas, the touch sensitive processing method comprising:

executing multiple sets of first round mutual capacitive detecting steps, wherein each set of the first round mutual capacitive detecting step further comprises:

having a driving circuit sending a driving signal to neighboring N first electrodes and neighboring N second electrodes, where N is a positive integer larger than 1;

having a sensing circuit simultaneously detecting the driving signal via the third electrodes for generating multiple first round first sensing information with respective to the set of first round mutual capacitive detecting step, wherein each of the first round first sensing information is corresponding to an intersection of a figurative central line of the N first electrodes and one of the plurality of third electrodes; and having the sensing circuit simultaneously detecting the driving signal via the fourth electrodes for generating multiple first round second sensing information with respective to the set of first round mutual capacitive detecting step, wherein each of the first round second sensing information is corresponding to an intersection of a figurative central line of the N second electrodes and one of the plurality of fourth electrodes.

19. The touch sensitive processing method of claim 18, further comprising:

calculating at least one position of the at least one object on the touch screen according to the multiple first round first sensing information and the multiple first round second sensing information generated from the multiple first round mutual capacitive detecting steps; and reporting the at least one position to a host.

20. The touch sensitive processing method of claim 18, further comprising:

executing at least one first round first special mutual capacitive detecting step, comprising:

having the driving circuit sending the driving signal to neighboring $M_1$ first electrodes, where $M_1$ is a positive integer smaller than N, the neighboring $M_1$ first electrodes do not include the first electrodes having been sent the driving signal in the multiple sets of first round mutual capacitive detecting steps; and having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of a figurative central line of the $M_1$ first electrodes and one of the plurality of third electrodes, wherein the touch sensitive processing method directs to and adjusts one of or any combination of parameters to make detecting strengths of the third electrode with respective to the $M_1$ first electrodes and the N first electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

21. The touch sensitive processing method of claim 20, further comprising:

executing another first round first special mutual capacitive detecting step, comprising:

having the driving circuit sending the driving signal to neighboring $M_2$ first electrodes, where $M_2$ is a positive integer smaller than N and is not equal to $M_1$, the neighboring $M_2$ first electrodes do not include the first electrodes and the $M_1$ first electrodes having been sent the driving signal in the multiple sets of first round mutual capacitive detecting steps; and having the sensing circuit simultaneously detecting the driving signal via the third electrodes for generating multiple first round first special sensing information with respective to the set of first round first special mutual capacitive detecting step, wherein each of the first round first special sensing information is corresponding to an intersection of a figurative central line of the $M_2$ first electrodes and one of the plurality of third electrodes, wherein the touch sensitive processing method directs to and adjusts one of or any combination of parameters to make detecting strengths of the third electrode with respective to the $M_2$ first electrodes and the N first electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

22. The touch sensitive processing method of claim 20, further comprising:

calculating at least one first round position of the at least one object on the touch screen according to the multiple first round sensing information generated from the multiple sets of first round mutual capacitive detecting steps and the multiple first round first special sensing information generated from all of the first round first special mutual capacitive detecting steps; and reporting the at least one first round position to a host.

23. The touch sensitive processing method of claim 20, further comprising:
executing at least one first round second special mutual capacitive detecting step, comprising:
having the driving circuit sending the driving signal to neighboring $M_3$ second electrodes, where $M_3$ is a positive integer smaller than N, the neighboring $M_3$ second electrodes do not include the second electrodes having been sent the driving signal in the multiple sets of first round mutual capacitive detecting steps; and
having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of a figurative central line of the $M_3$ second electrodes and one of the plurality of fourth electrodes,
wherein the touch sensitive processing method directs to and adjusts one of or any combination of parameters to make detecting strengths of the fourth electrode with respective to the $M_3$ second electrodes and the N second electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

24. The touch sensitive processing method of claim 23, further comprising:
executing another first round second special mutual capacitive detecting step, comprising:
having the driving circuit sending the driving signal to neighboring $M_4$ second electrodes, where $M_4$ is a positive integer smaller than N and is not equal to $M_3$, the neighboring $M_4$ second electrodes do not include the second electrodes and the $M_3$ second electrodes having been sent the driving signal in the multiple sets of first round mutual capacitive detecting steps; and
having the sensing circuit simultaneously detecting the driving signal via the fourth electrodes for generating multiple first round second special sensing information with respective to the set of first round second special mutual capacitive detecting step, wherein each of the first round second special sensing information is corresponding to an intersection of a figurative central line of the $M_4$ second electrodes and one of the plurality of fourth electrodes,
wherein the touch sensitive processing method directs to and adjusts one of or any combination of parameters to make detecting strengths of the fourth electrode with respective to the $M_4$ second electrodes and the N second electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

25. The touch sensitive processing method of claim 24, further comprising:
calculating at least one first round position of the at least one object on the touch screen according to the multiple first round sensing information generated from the multiple sets of first round mutual capacitive detecting steps, the multiple first round first special sensing information generated from all of the first round first special mutual capacitive detecting steps, and the multiple first round second special sensing information generated from all of the first round second special mutual capacitive detecting steps; and
reporting the first round position to a host.

26. The touch sensitive processing method of claim 18, further comprising:
executing iteratively the following steps for N−1 times:
executing multiple X-th round mutual capacitive detecting steps, where X is a positive integer from 2 to N, wherein each of the X-th round mutual capacitive detecting steps comprises:
having the driving circuit simultaneously sending the driving signal to neighboring N first electrodes and neighboring N second electrodes, where N is a positive integer larger than 1; and
having the sensing circuit simultaneously detecting the driving signal via the third electrodes for generating multiple X-th round first sensing information with respective to the set of X-th round mutual capacitive detecting step, having the sensing circuit simultaneously detecting the driving signal via the fourth electrodes for generating multiple X-th round second sensing information with respective to the set of X-th round mutual capacitive detecting step, wherein each of the X-th round second sensing information is corresponding to an intersection of a figurative central line of the N second electrodes and one of the plurality of fourth electrodes; and
executing one X-th round special mutual capacitive detecting step, comprising:
having the driving circuit sending the driving signal to neighboring $M_x$ first electrodes and neighboring $M_y$ second electrodes, where $M_x$, $M_y$ are positive integers smaller than N, the neighboring $M_x$ first electrodes do not include the first electrodes having been sent the driving signal in the multiple sets of X-th round mutual capacitive detecting steps, the neighboring $M_y$ second electrodes do not include the second electrodes having been sent the driving signal in the multiple sets of X-th round mutual capacitive detecting steps; and
having the sensing circuit simultaneously detecting the driving signal via the third electrodes for generating multiple X-th round first special sensing information with respective to the set of X-th round special mutual capacitive detecting step, wherein each of the X-th round first special sensing information is corresponding to an intersection of a figurative central line of the $M_x$ first electrodes and one of the plurality of third electrodes, having the sensing circuit simultaneously detecting the driving signal via the fourth electrodes for generating multiple X-th round second special sensing information with respective to the set of X-th round special mutual capacitive detecting step, wherein each of the X-th round second special sensing information is corresponding to an intersection of a figurative central line of the $M_y$ second electrodes and one of the plurality of fourth electrodes, wherein the touch sensitive processing method directs to and adjusts one of or any combination of parameters to make detecting strengths of the third electrode with respective to the $M_x$ first electrodes and the N first electrodes are equivalent, and to make detecting strengths of the fourth electrode with respective to the $M_y$ second electrodes and the N second electrodes are equivalent, wherein the parameters comprises: waveform, voltage, strength of the driving signal, driving duration, timing of driving, detecting duration, timing of detecting, time difference between the sensing timing and driving timing, resistance value of variable resistor of the sensing circuit, and gain value of amplifier of the sensing circuit.

27. The touch sensitive processing method of claim 26, further comprising:
executing iteratively the following steps for N times to get N p-th round position of the at least one object on the touch screen:
calculating at least one p-th round position of the at least one object on the touch screen according to the multiple p-th round sensing information generated from the multiple set of p-th round mutual capacitive detecting steps, the multiple p-th round first special sensing information, and the multiple p-th round second special sensing information;
averaging N p-th round position to get an average position, where p is a positive integer from 1 to N; and
reporting the average position to a host.

28. The touch sensitive processing method of claim 21, wherein the neighboring $M_p$ first electrodes and the neighboring $M_q$ first electrodes comprise different first electrodes, where p and q are different positive integers ranging from 1 to N.

29. The touch sensitive processing method of claim 21, wherein the value of $M_p$ is the same as the value of $M_q$, where p and q are different positive integers ranging from 1 to N.

30. The touch sensitive processing method of claim 20, wherein the neighboring $M_p$ first electrodes are selected in random, where p is a positive integer from 1 to N.

31. The touch sensitive processing method of claim 20, wherein the neighboring $M_1$ first electrodes are the $M_1$ first electrodes near one edge of the touch screen, the neighboring $M_N$ first electrodes are the $M_N$ first electrodes near the other edge of the touch screen.

32. The touch sensitive processing method of claim 18, wherein the first electrodes and the second electrodes are parallel to the pixel axis of the touch screen.

33. The touch sensitive processing method of claim 18, wherein the touch screen is an in-cell touch LCD screen, a common electrode of the touch screen comprises at least one first electrode and at least one second electrode.

34. The touch sensitive processing method of claim 18, further comprising:
having the driving circuit sending the driving signal to all of the first electrodes and the second electrodes before executing the multiple sets of first round mutual capacitive detecting steps;
having the sensing circuit simultaneously sensing the driving signal via the third electrodes to generate a one-dimensional first half screen sensing information, having the sensing circuit simultaneously sensing the driving signal via the fourth electrodes to generate a one-dimensional second half screen sensing information;
determining if at least one object approximating or touching at least one of the third electrodes according to the one-dimensional first half screen sensing information;
determining if at least one object approximating or touching at least one of the fourth electrodes according to the one-dimensional second half screen sensing information; and
executing the multiple first round mutual capacitive detecting steps when the at least one object approximating or touching at least one of the third electrodes and at least one of the fourth electrodes is determined.

35. An electronic system used to detect at least one object approximating or touching a touch screen, the electronic system comprising:
the touch screen, comprising
a plurality of neighboring first electrodes and a plurality of neighboring second electrodes parallel to a first axis; and
a plurality of neighboring third electrodes and a plurality of neighboring fourth electrodes parallel to a second axis, wherein each of the first electrodes intersects with the third electrodes to form the multiple intersection areas, each of the second electrodes intersects with the fourth electrodes to form the multiple intersection areas; and
a touch sensitive processing apparatus, comprising:
a driving circuit, connecting to the first electrodes and the second electrodes, respectively;
a sensing circuit, connecting to the third electrodes and the fourth electrodes, respectively; and
a processor, configured to connect to the driving circuit and the sensing circuit, the processor configured for:
executing multiple sets of first round mutual capacitive detecting steps, wherein each set of the first round mutual capacitive detecting step further comprises:
having the driving circuit sending a driving signal to neighboring N first electrodes and neighboring N second electrodes, where N is a positive integer larger than 1;
having the sensing circuit simultaneously detecting the driving signal via the third electrodes for generating multiple first round first sensing information with respective to the set of first round mutual capacitive detecting step, wherein each of the first round first sensing information is corresponding to an intersection of a figurative central line of the N first electrodes and one of the plurality of third electrodes; and
having the sensing circuit simultaneously detecting the driving signal via the fourth electrodes for generating multiple first round second sensing information with respective to the set of first round mutual capacitive detecting step, wherein each of the first round second sensing information is corresponding to an intersection of a figurative central line of the N second electrodes and one of the plurality of fourth electrodes.

* * * * *